(12) United States Patent
Browne et al.

(10) Patent No.: US 9,558,480 B2
(45) Date of Patent: Jan. 31, 2017

(54) PHONE-ON-FILE OPT-IN AT A MERCHANT SERVER

(71) Applicant: Boku, Inc., San Francisco, CA (US)

(72) Inventors: John P. Browne, Larkspur, CA (US); Pankhudi Pankhudi, San Francisco, CA (US); Natalya Elkanova, San Francisco, CA (US); James C. McIntyre, San Francisco, CA (US); Annie Minh Ma, Fremont, CA (US)

(73) Assignee: Boku, Inc., San Francisco, CA (US)

( * ) Notice: Subject to any disclaimer, the term of this patent is extended or adjusted under 35 U.S.C. 154(b) by 41 days.

(21) Appl. No.: 13/928,046

(22) Filed: Jun. 26, 2013

(65) Prior Publication Data

US 2015/0006373 A1    Jan. 1, 2015

(51) Int. Cl.
| | | |
|---|---|---|
| *G06Q 20/16* | (2012.01) | |
| *G06Q 20/14* | (2012.01) | |
| *G06Q 20/38* | (2012.01) | |
| *G06Q 20/00* | (2012.01) | |
| *G06Q 40/00* | (2012.01) | |
| *G06Q 40/04* | (2012.01) | |
| *G06Q 20/04* | (2012.01) | |
| *G06Q 20/32* | (2012.01) | |

(52) U.S. Cl.
CPC ............. *G06Q 20/16* (2013.01); *G06Q 20/00* (2013.01); *G06Q 20/04* (2013.01); *G06Q 20/14* (2013.01); *G06Q 20/3255* (2013.01); *G06Q 20/385* (2013.01); *G06Q 40/00* (2013.01); *G06Q 40/04* (2013.01)

(58) Field of Classification Search
CPC ............................ G06Q 40/00; G06Q 20/0004
USPC ......... 705/26, 39, 44, 72; 455/466; 709/223, 709/225; 380/270
See application file for complete search history.

(56) References Cited

U.S. PATENT DOCUMENTS

| | | | |
|---|---|---|---|
| 2002/0035539 A1* | 3/2002 | O'Connell ..................... 705/39 |
| 2002/0181710 A1* | 12/2002 | Adam et al. .................. 380/270 |
| 2007/0106564 A1* | 5/2007 | Matotek et al. ............... 705/26 |
| 2008/0195550 A1* | 8/2008 | Smith ............................. 705/72 |
| 2010/0030651 A1 | 2/2010 | Matotek et al. |
| 2011/0053618 A1 | 3/2011 | Lin et al. |

(Continued)

OTHER PUBLICATIONS

TCF Communications Carriers Form; Code for New Zealand Payforit Trusted Mobile Payment Framework: Jul. 20, 2011.*

(Continued)

*Primary Examiner* — Harish T Dass
(74) *Attorney, Agent, or Firm* — Stephen M. De Klerk

(57) ABSTRACT

A phone-on-file opt-in method is described. A phone-on-file opt-in request is received at the billing server including a msisdn and a merchant supplied unique consumer identifier. The billing server confirms the phone-on-file opt-in with a consumer device and records a phone-on-file opt-in status as active if the first phone-on-file is confirmed. A charge method includes receiving, at the billing server, a charge API call from a merchant server including at least one identifier and an amount, determining a phone-on-file opt-in status corresponding to the identifier at the billing server and transmitting a request to charge a user account to a carrier server if the phone-on-file opt-in status is active, but not if the phone-on-file opt-in status is inactive, the request including an amount corresponding to the amount received in the charge API call.

7 Claims, 27 Drawing Sheets

(56) References Cited

U.S. PATENT DOCUMENTS

| | | |
|---|---|---|
| 2011/0125610 A1 | 5/2011 | Goodsall et al. |
| 2012/0011066 A1* | 1/2012 | Telle et al. .................... 705/44 |
| 2012/0059922 A1* | 3/2012 | Jason et al. .................. 709/223 |
| 2012/0079513 A1 | 3/2012 | Nahata et al. |
| 2012/0173348 A1 | 7/2012 | Yoo et al. |
| 2013/0073463 A1 | 3/2013 | Dimmick et al. |
| 2013/0124412 A1* | 5/2013 | Itwaru ............................ 705/44 |
| 2013/0316703 A1* | 11/2013 | Girard et al. ............. 455/432.1 |
| 2014/0235198 A1 | 8/2014 | Lee et al. |

OTHER PUBLICATIONS

"International Search Report and Written Opinion mailed on Mar. 10, 2015", International Patent Application No. PCT/US14/44432 with International Filing Date of Jun. 26, 2014, (11 pages).

* cited by examiner

FIG. 3

Bigpoint

☐ Account details  ☐ Choose your product  ☐ Validate and finish

Almost there...

Please select a payment method

○ Credit Card 1    ○ Credit Card 2    ○ PayPal    ● Mobile Phone

Continue

Powered by
Billing Server

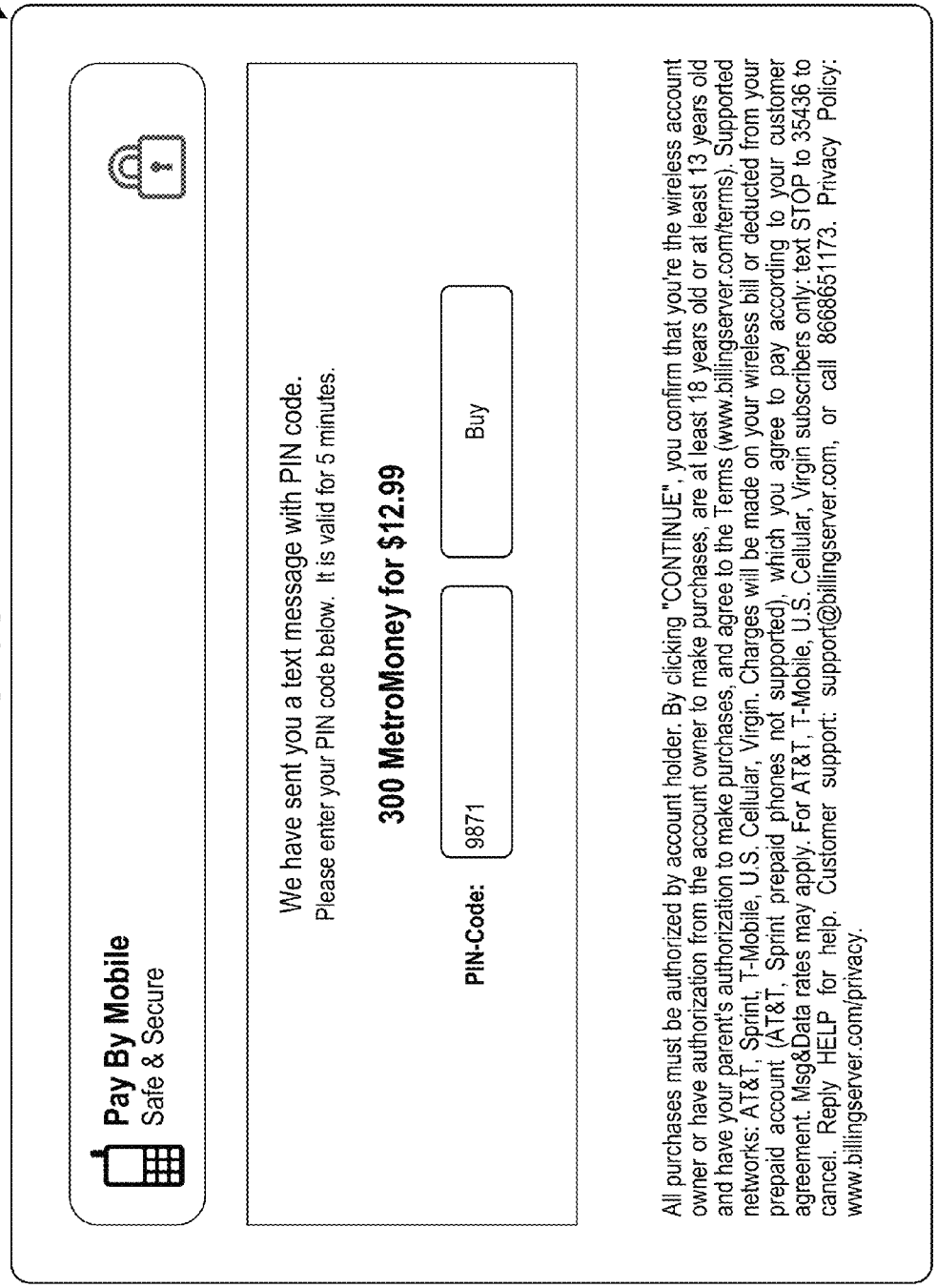

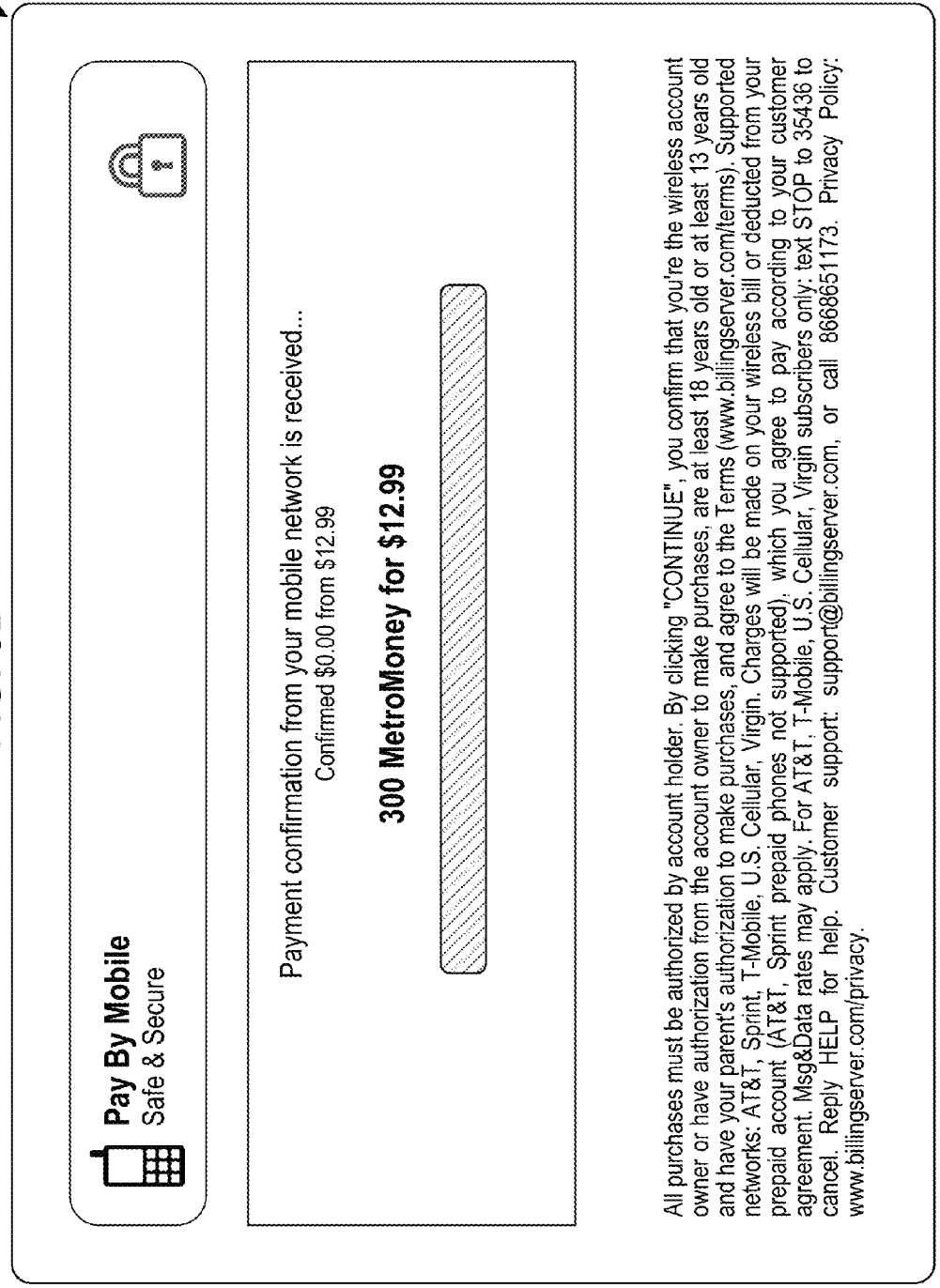

FIG. 10

Receipt

Order Number   11754933394015
Date           2012-10-10
Payment method MOBILE 415-123-4567
Email          user@email.com
Retailer       Bigpoint You have registered your phone-on-file with Bigpoint for up to 90 days or $100. Msg&data rates may apply. Billingserver.com/support

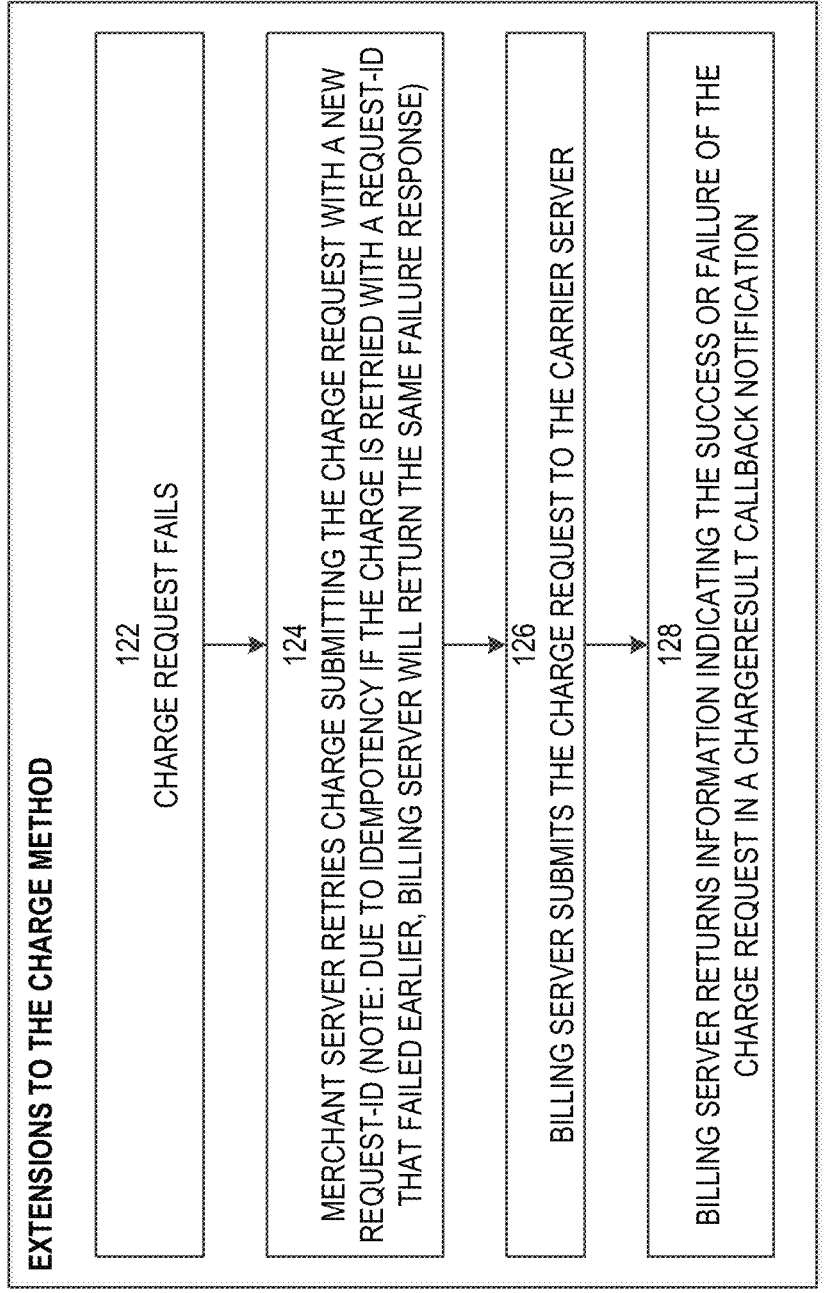

PHONE-ON-FILE OPT-IN AT A MERCHANT SERVER

BACKGROUND OF THE INVENTION

1). Field of the Invention

This invention relates to a system and method for opting-in to a phone-on-file relationship for purposes of billing a consumer.

2). Discussion of Related Art

A consumer who shops for goods or services online may often be given the option to use a selection of payment sources during checkout, such as payment by credit card, debit card, payment from an account held by an institution, or to charge for a purchase on their phone bill. When the consumer selects to charge to their phone bill, a merchant server instructs a billing server which is aligned with a carrier server to carry out the charge. The billing server usually communicates with a consumer mobile phone to confirm the charge before placing the charge on the phone bill at the carrier server.

When the billing server communicates with a consumer mobile phone the billing server often transmits a PIN code to the consumer mobile phone. The consumer then has to enter the PIN code into a user interface of the merchant server. This is a requirement by the carrier server because the carrier server usually requires to confirm the charge with the consumer mobile phone. Such a process may be arduous for many consumers who make many purchases from a particular merchant, in which case the purchase may be lost to the merchant.

SUMMARY OF THE INVENTION

The invention provides a method of managing transactions with a merchant server including receiving a msisdn from a consumer device at the merchant server, transmitting a first phone-on-file opt-in request from the merchant server to a billing server, including the msisdn, receiving a PIN code from the consumer device, transmitting a second phone-on-file opt-in request from the merchant server to the billing server, including the PIN code and receiving a response from the billing server at the merchant server indicating whether the PIN code is verified or invalid, and if the opt-in status is verified, transmitting a charge API call from the merchant server to the billing server if the PIN code is verified but not if the PIN code is invalid, the charge API call including an amount and an identifier for the billing server to determine a phone-on-file opt-in status corresponding to the identifier and receiving a chargeresult callback notification from the billing server at the merchant server indicating whether a user account at a carrier server has been charged by the billing server, and if the opt-in status is invalid, transmitting, with the merchant server, a call to the billing server with a phone number and amount to be charged, transmitting, with the merchant server, an interface to the consumer device with a PIN field, receiving, at the merchant server, a PIN code entered by a user into the PIN code field, transmitting, with the merchant server, the PIN code to the billing server and receiving, with the merchant server, a confirmation from the billing server that the amount has been charged.

The invention also provides a computer-readable medium having stored thereon a set of instructions which, when executed by a processor of a computer performs a method of managing transactions with a merchant server including receiving a msisdn from a consumer device at the merchant server, transmitting a first phone-on-file opt-in request from the merchant server to a billing server, including the msisdn, receiving a PIN code from the consumer device, transmitting a second phone-on-file opt-in request from the merchant server to the billing server, including the PIN code and receiving a response from the billing server at the merchant server indicating whether the PIN code is verified or invalid, and if the opt-in status is verified, transmitting a charge API call from the merchant server to the billing server if the PIN code is verified but not if the PIN code is invalid, the charge API call including an amount and an identifier for the billing server to determine a phone-on-file opt-in status corresponding to the identifier and receiving a chargeresult callback notification from the billing server at the merchant server indicating whether a user account at a carrier server has been charged by the billing server, and if the opt-in status is invalid, transmitting, with the merchant server, a call to the billing server with a phone number and amount to be charged, transmitting, with the merchant server, an interface to the consumer device with a PIN field, receiving, at the merchant server, a PIN code entered by a user into the PIN code field, transmitting, with the merchant server, the PIN code to the billing server and receiving, with the merchant server, a confirmation from the billing server that the amount has been charged.

The invention further provides a merchant server including a processor, a computer-readable medium connected to the processor and a set of instructions on the computer-readable medium and executable by the processor. The set of instructions includes a user interface transmitted to a consumer device with a msisdn field for entry of a msisdn and receivable by the processor and transmitted to a billing server in a first phone-on-file opt-in request and a PIN code field for entry of a PIN code and receivable by the processor and transmitted to the billing server in a second phone-on-file opt-in request and a recurring billing management module executing a charge method including if the opt-in status is invalid, transmitting a charge API call from the merchant server to the billing server if the PIN code is verified but not if the PIN code is invalid, the charge API call including an amount and an identifier for the billing server to determine a phone on-file opt-in status corresponding to the identifier and receiving a chargeresult call back notification from the billing server at the merchant server indicating whether a user account at a carrier server has been charged by the billing server, and if the opt-in status is invalid, transmitting, with the merchant server, a call to the billing server with a phone number and amount to be charged, transmitting, with the merchant server, an interface to the consumer device with a PIN field, receiving, at the merchant server, a PIN code entered by a user into the PIN code field, transmitting, with the merchant server, the PIN code to the billing server and receiving, with the merchant server, a confirmation from the billing server that the amount has been charged.

BRIEF DESCRIPTION OF THE DRAWINGS

The invention is further described by way of example with reference to the accompanying drawings, wherein:

FIG. 3 is a view of a user interface that resides on the merchant server and is transmitted to the consumer mobile phone or another consumer device where a consumer selects payment by phone for a subscription;

FIG. 5C is a view of the user interface in FIG. 1 wherein the user enters the PIN code that is received in the text message of FIG. 5B;

FIG. 5D is a view of the user interface in FIG. 1 after the user has entered the PIN code and the transaction has been confirmed;

FIG. 10 is a view of the user interface that is displayed at the consumer mobile phone to indicate that the PIN code has been validated and that the subscription is now available to the consumer account on the merchant server;

FIG. 15 is a flow chart showing extensions to the charge method in FIG. 15;

DETAILED DESCRIPTION OF THE INVENTION

Figure 1:
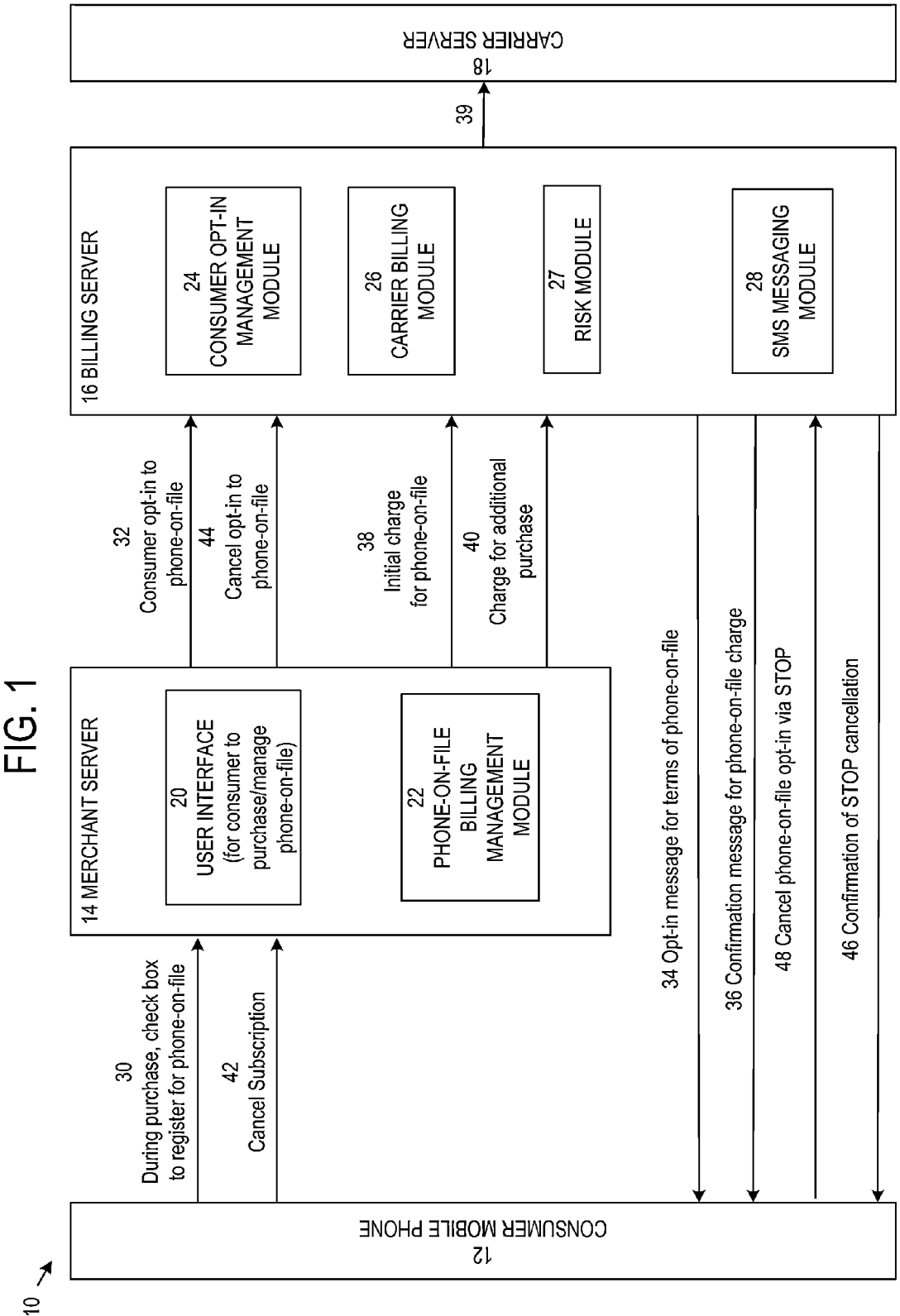
FIG. 1 is a block diagram of system for managing transactions, the system including a consumer mobile phone, a merchant server, a billing server and a carrier server.

FIG. 1 of the accompanying drawings illustrates a phone-on-file based billing system 10, according to an embodiment of the invention, including a consumer mobile phone 12, a merchant server 14, a billing server 16 and a carrier server 18. The merchant server 14 includes a user interface 20 for a consumer using the consumer mobile phone 12 or other consumer device to purchase and manage phone-on-file opt-in, and a phone-on-file billing management module 22. The billing server 16 includes a consumer opt-in management module 24, a carrier billing module 26 and a Short Message Service (SMS) messaging module 28.

The consumer mobile phone 12 communicates with the merchant server 14 at 30 through the user interface 20 to opt-in to an automatic charging for future purchases by storing a phone number on file (phone-on-file) and the merchant server 14 communicates with the billing server 16 at 32 with a set of data that allows the billing server 16 to communicate with the consumer mobile phone 12 for purposes of confirming phone-on-file opt-in by the consumer mobile phone 12. At 34, the SMS messaging module 28 communicates via text messaging with the consumer mobile phone 12 to confirm phone-on-file opt-in by the consumer mobile phone 12 and at 36 transmits a text message confirming phone-on-file opt-in by the consumer. At 38, the recurring billing management module 22 initiates a charge through the carrier billing module 26. At 39, the carrier billing module 29 attempts to place the charge on an account corresponding to a phone number of the consumer mobile phone 12 on the carrier server 18. At 40, charges for additional purchases are applied for the phone-on-file opt-in and at 39 are communicated to the carrier server 18.

At 42, the consumer mobile phone 12 can cancel the phone-on-file opt-in through the user interface 20, which results in a communication at 44 to cancel the phone-on-file opt-in and receive a corresponding text message at 46 from the SMS messaging module 28. Alternatively, the consumer mobile phone 12 can at 48 send a text message directly to the billing server 16 to cancel the phone-on-file opt-in and then receive the text message at 46 from the SMS messaging module 28.

Figure 2:
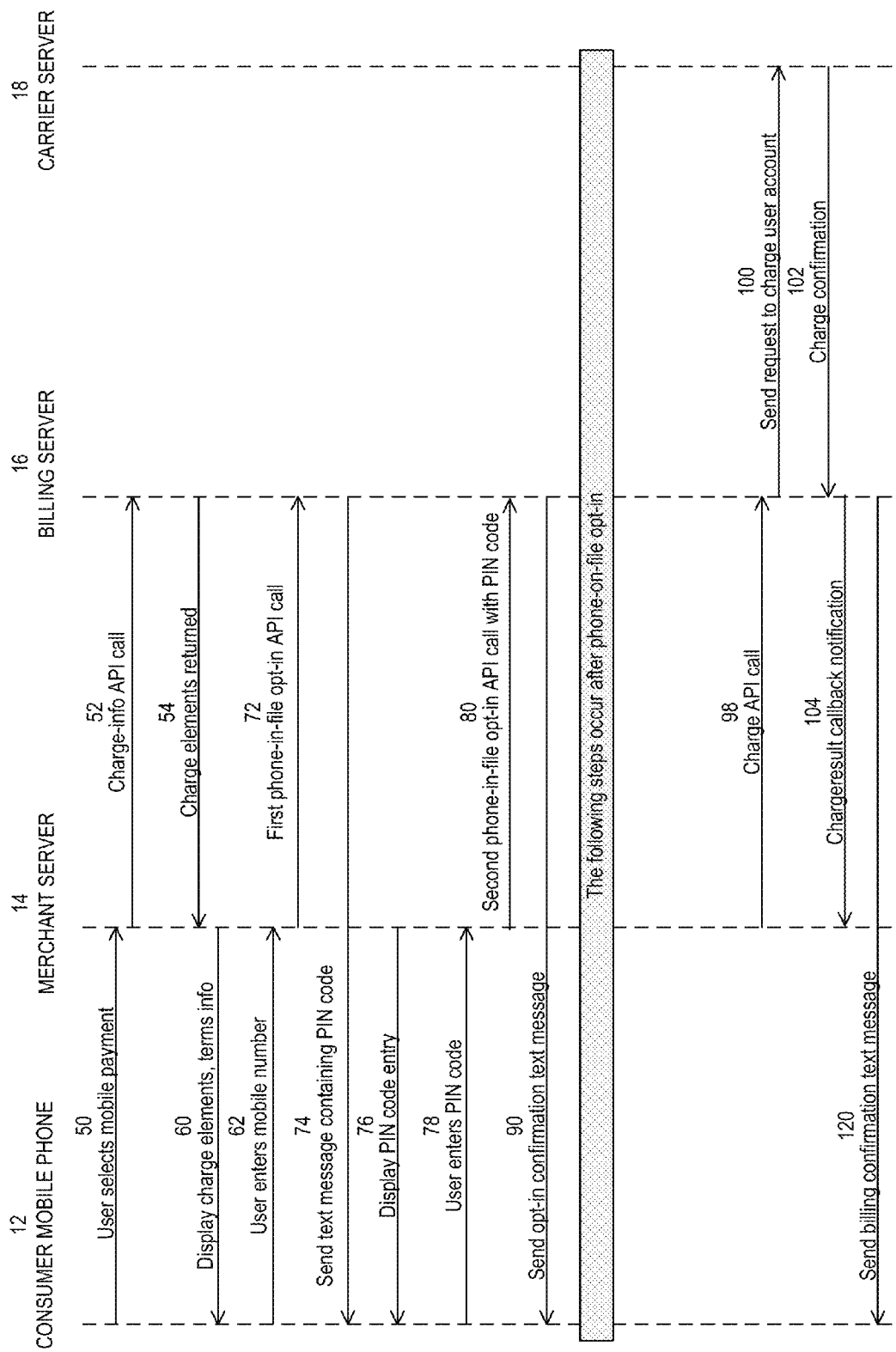
FIG. 2 is an interactive diagram illustrating how the consumer mobile phone, merchant server, billing server and carrier server interact for establishing a subscription opt-in and a subsequent charge.

FIG. 2 illustrates the process for the consumer mobile phone 12 to opt-in to a phone-on-file billing and charging arrangement and subsequent charging of the consumer. At 50, the consumer makes a selection using the user interface 20 in FIG. 1 to pay using mobile payment. FIG. 3 shows a view of the user interface 20 that is displayed to the consumer mobile phone 12 for making the selection.

Following the selection by the consumer mobile phone 12 at 50, the merchant server 14 at 52 transmits a charge-info application programmable interface (API) call to the billing server 16. The charge-info call is submitted to a dedicated uniform response locator (URL) of the billing server 16 such as https:/gateway.billingserver.com/charge-info. The charge-info method is then used by the billing server 16 to obtain information regarding the elements required to charge a consumer and the required localized strings to display to a consumer. These elements are country specific and in some cases may be network specific.

In general, the msisdn and the network of the consumer mobile phone 12 are required inputs to collect from the consumer mobile phone 12. In some countries there can be additional elements such as a zip code or a resident registration number. A charge-info API response transmitted at 54 contains the input elements required for each country and network. The charge-info API response also supplies localized strings that can be used as labels for these input fields.

The primary text that needs to be displayed to the consumer mobile phone 12 are the terms and conditions strings for the country or network. The API returns a terms-and-conditions element for the country and, if required, for the network as well and are in many cases different for different countries or networks. The localized text for the terms and conditions is returned in '<string>' tags. If a country or network requires that the consumer mobile phone 12 accept terms and conditions, a terms and conditions input element will be included as a checkbox.

By default, the charge-info API response returns information regarding all countries that the billing server 16 supports. The API supports an optional country parameter to filter the response to a specific country. Table 1 shows the charge-info request parameters that are required and Table 2 shows the charge-info response parameters.

TABLE 1

| Parameter | Type | Description | Required |
|---|---|---|---|
| country | String | Country code in International Standards Organization (ISO) 3166-1-alpha-2 standard. Optional filter. | No |
| merchant-id | String | Billing server assigned merchant identifier value. | Yes |

TABLE 2

| Field | Type | Description | Returned |
|---|---|---|---|
| result-code | String | The result code for this request. | Yes |
| result-message | String | Human readable description of the result. | Yes |

The following is an example of strings in a charge-info response to a charge-info request:

```xml
<?xml version="1.0" encoding="UTF-8" standalone="yes"?>
<charge-info>
    <api-version>1.0</api-version>
    <result-code>0</result-code>
    <result-message>Operation Successful</result-message>
    <country code="US" name="United States">
        <languages>
            <language code="en">
                <strings language="en">
                    <string id="MOBILE_NETWORK_LABEL">Select your network</string>
                    <string id="MOBILE_NUMBER_LABEL">Mobile number</string>
                    <string id="ZIP_CODE_LABEL">Zip Code:</string>
                    <string id="PHONE_EXAMPLE">E.g. 123-123-1234</string>
                    <string id="TERMS_LABEL">I agree to the Terms of Use</string>
                    <string id="TERMS_STR">All purchases must be authorized by account holder. By clicking "CONTINUE", you confirm that you're the wireless account owner or have authorization from the account owner to make purchases, are at least 18 years old or at least 13 years old and have your parent's authorization to make purchases, and agree to the Terms (www.boku.com/terms). Supported networks: AT&T, Sprint, T-Mobile, U.S. Cellular, Virgin. Charges will be made on your wireless bill or deducted from your prepaid account (AT&T, Sprint prepaid phones not supported), which you agree to pay according to your customer agreement. Msg&Data rates may apply. For AT&T, T-Mobile, U.S. Cellular, Virgin subscribers only: text STOP to 35436 to cancel. Reply HELP for help. Customer support: support@boku.com, or call 8668651173. Privacy Policy: www.boku.com/privacy.
                    </string>
                    <string id="SPRINT_TERMS_LABEL">I agree to Sprint's Terms of Use</string>
                    <action id="PHONE_ON_FILE_OPTIN" type="USER_INPUT" method="POST" url=" " label-string-id="PHONE_ON_FILE_OPTIN_BUTTON_LABEL">
                    <action id="SHOW_PHONE_ON_FILE_TERMS" type = "USER_ACTION" method="POST" url=" " label-string-id="PHONE_ON_FILE_TERMS_BUTTON_LABEL"/>
                    </string>
                </strings>
            </language>
        </languages>
        <networks>
            <network id="13f020" name="AT&T" />
            <network id="13f030" name="Verizon Wireless" />
            <network id="13f050" name="Sprint">
                <inputs>
                    <input name="zipcode" type="NUMBER" label-string-id="ZIP_CODE_LABEL" validation-regex="^[0-9]{5}$" />
                    <input name="sprint-terms-agreement" type="CHECKBOX" label-string-id="SPRINT_TERMS_LABEL" validation-regex="^0|1$" />
                </inputs>
                <terms-and-conditions label-string-id="SPRINT_TERMS_STR" />
```

```
                </network>
                <network id="13f040" name="T-Mobile" />
            </networks>
            <inputs>
                <input name="network" type="SELECT" label-string-
id="MOBILE_NETWORK_LABEL" validation-
regex="^(?:13f020|13f030|13f050|13f040)$">
                    <options>
                        <option value="13f020">AT&T</option>
                        <option value="13f030">Verizon Wireless</option>
                        <option value="13f050">Sprint</option>
                        <option value="13f040">T-Mobile</option>
                    </options>
                </input>
                <input name="msisdn" type="TEXT" label-string-
id="MOBILE_NUMBER_LABEL" validation-regex="^([ 0-9]*(?:1)?(?!1)(?:[ 0-9]*[0-
9]){10}|US[0-9]{2})$"
                    hint-string-id="PHONE_EXAMPLE" />
                <input name="terms-agreement" type="CHECKBOX" label-string-
id="TERMS_LABEL" validation-regex="^0|1$" />
            </inputs>
            <terms-and-conditions label-string-id="TERMS_STR" />
        </country>
    </charge-info>
```

Figure 4:
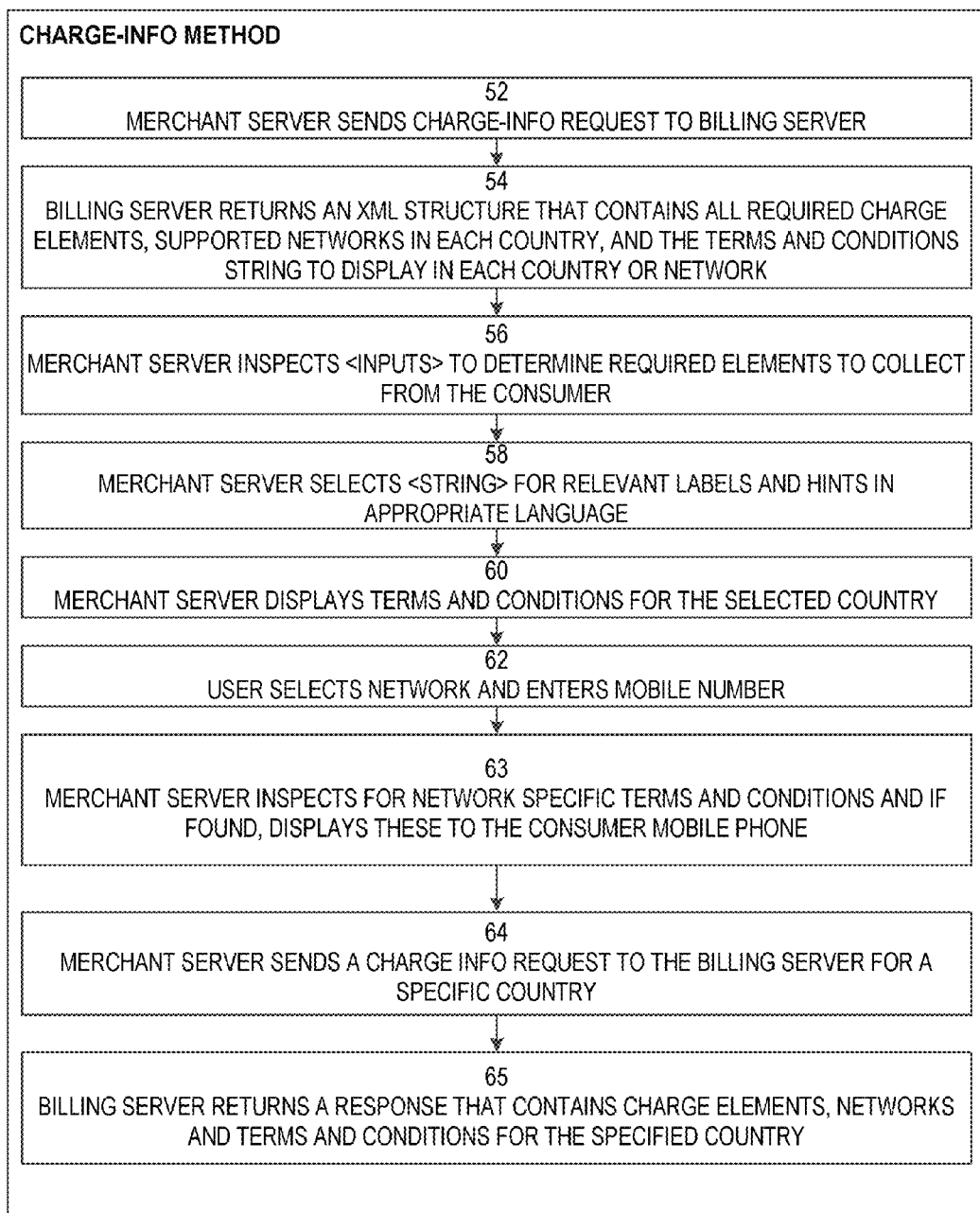
FIG. 4 is a flow chart illustrating a charge-info method that is used by the merchant server to retrieve charge elements from the billing server, presenting a view of the user interface to the consumer mobile phone and retrieving data entered into fields corresponding to the charge elements from the consumer mobile phone.

An example of the charge-info method is illustrated in FIG. 4. At 52, the merchant sends the charge-info request to the billing server 16. At 54, the billing server 16 returns an XML structure that contains all required charge elements, supported networks in each country, and the terms and conditions string to display in each country or network. At 56, the merchant server 14 inspects <inputs> in the XML structure to determine required elements to collect from the consumer. At 58, the merchant server 14 selects <string> from the XML structure for relevant labels and hints in the appropriate language. At 60, the merchant server 14 displays terms and conditions for the selected country. At 62, the user selects the network and enters their mobile number. At 63, the merchant server 14 inspects for network specific terms and conditions and if found, displays these to the consumer at the consumer mobile phone 12. At 64, the merchant server 14 sends a charge-info request to the billing server 16 for a specific country. At 65, the billing server 16 returns a response that contains charge elements, networks and terms and conditions for the specific country.

Figure 5A:
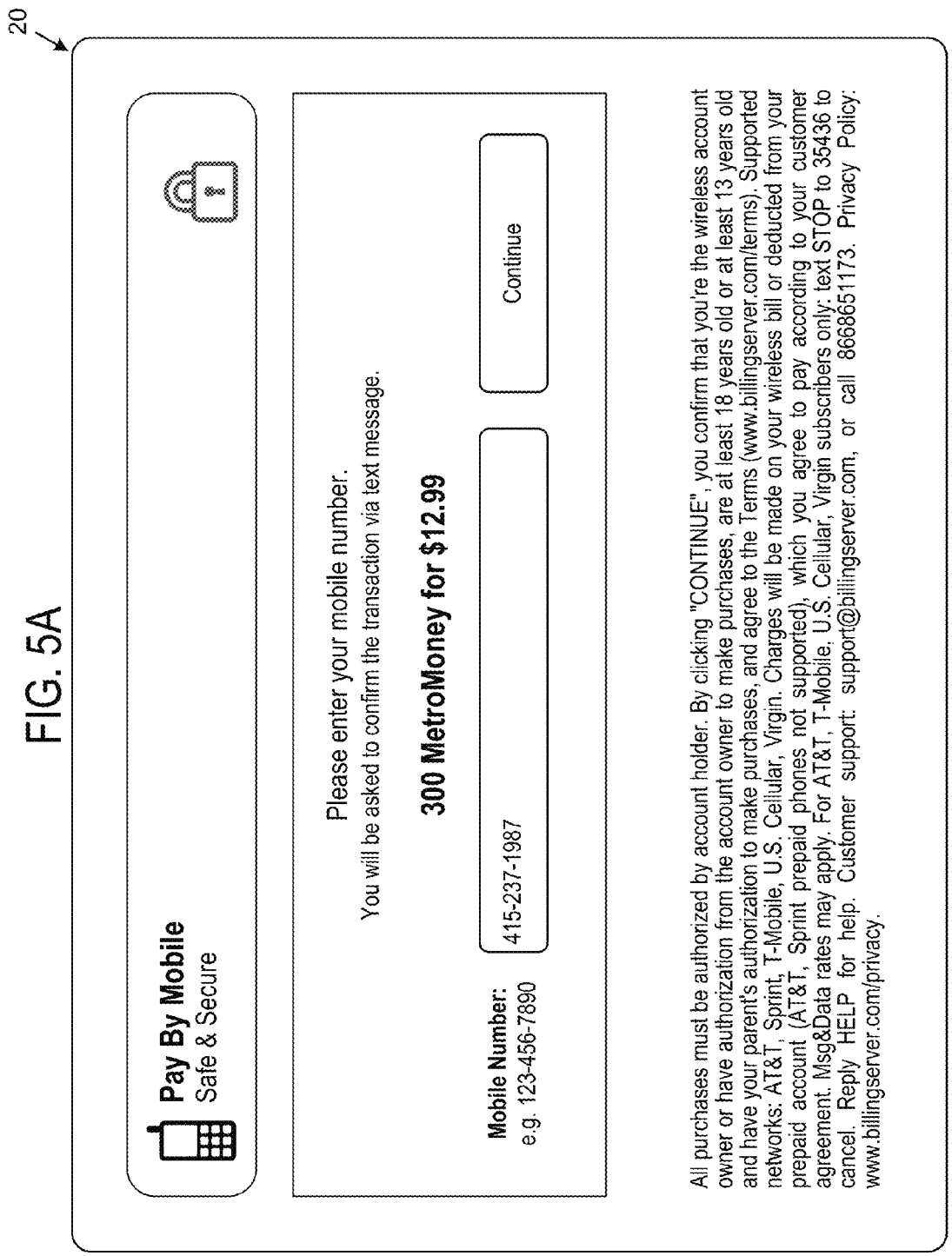
FIG. 5A shows a view of the user interface in FIG. 1 wherein a consumer is prompted to enter a phone number that is then recorded by the merchant server for purposes of making a purchase via the billing server.
Figure 5B:
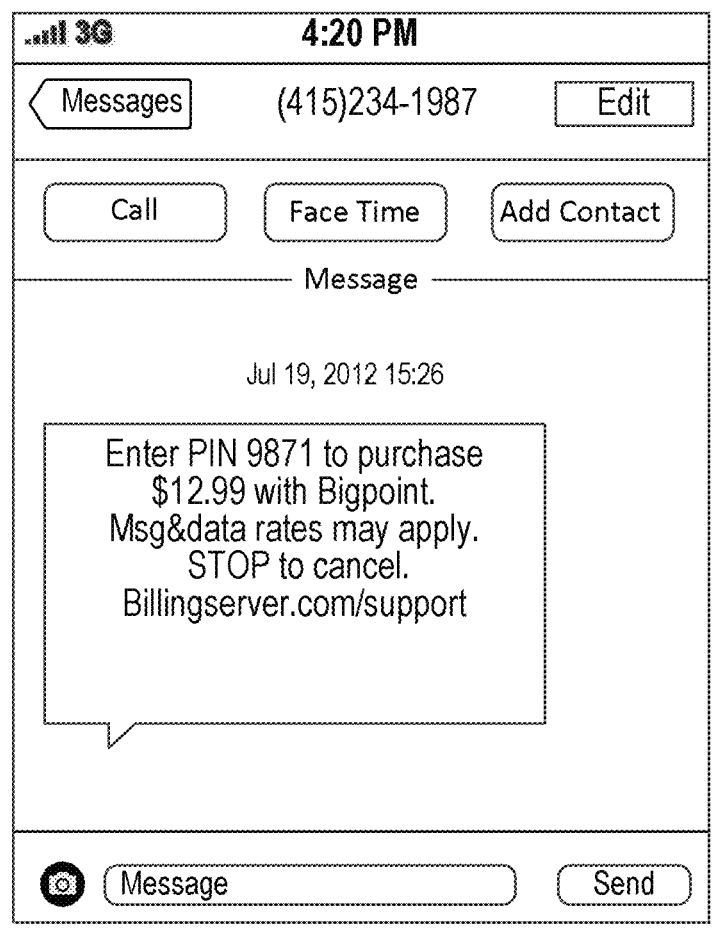
FIG. 5B is a text message that is received by the consumer mobile phone from the billing server after the billing server has generated a PIN code and the PIN code is included the text message.
Figure 5E:
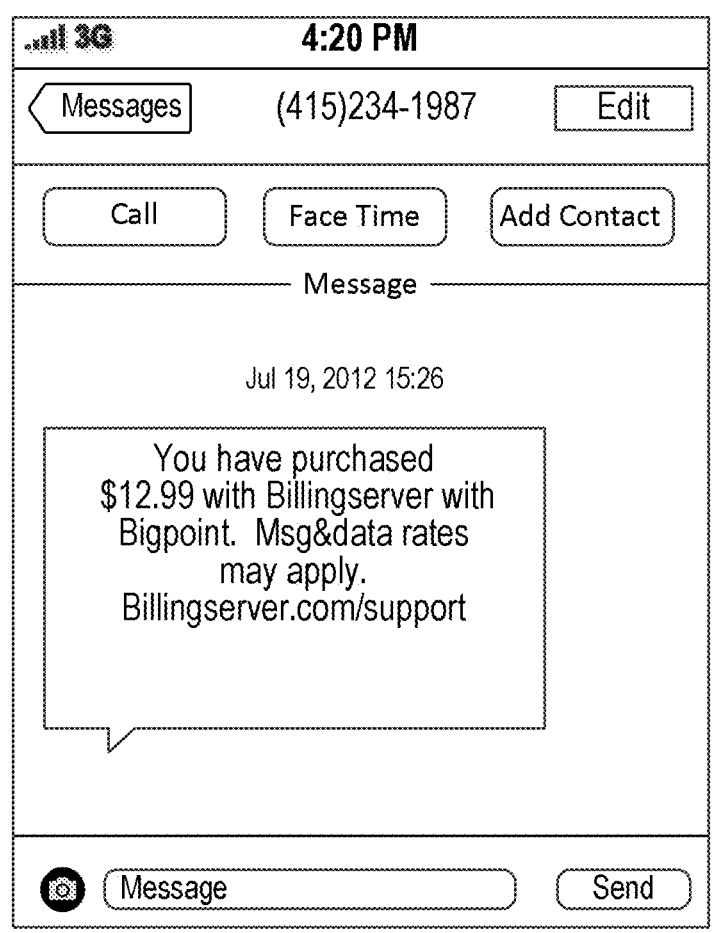
FIG. 5E is a message that is received by the consumer mobile phone after the transaction has been completed.

FIG. 5A shows a view of the user interface 20 in FIG. 1 wherein a consumer is prompted to enter a phone number that is then recorded by the merchant server 14 for purposes of making a purchase via the billing server 16. FIG. 5B illustrates a text message that is received by the consumer mobile phone 12 from the billing server 16 after the billing server 16 has generated a PIN code and the PIN code is included in the text message. The text message prompts the user to enter the PIN code into a user interface. FIG. 5C illustrates a view of the user interface 20 in FIG. 1 wherein the user enters the PIN code that is received in the text message of FIG. 5B. The PIN code is then transmitted through the merchant server 14 to the billing server 16. The billing server 16 verifies the PIN code received from the merchant server 14 against the PIN code transmitted to the consumer mobile phone 12 and approves the transaction if verified. The billing server 16 then communicates with the carrier server 18 to charge an account at the carrier server 18. FIG. 5D illustrates a view of the user interface 20 in FIG. 1 after the user has entered the PIN code and the transaction has been confirmed. FIG. 5E illustrates a message that is received by the consumer mobile phone 12 after the transaction has been completed. It should be noted at this point that once the consumer proceeds with the phone-on-file opt-in, that the message in FIG. 5A and the view in FIG. 5E will be bypassed by the merchant server 14 and the billing server 16. As such, the consumer will not be asked to enter a PIN code or to confirm a transaction. Instead, after making a purchase, the consumer will only receive the message as shown in FIG. 5E.

Figure 6:
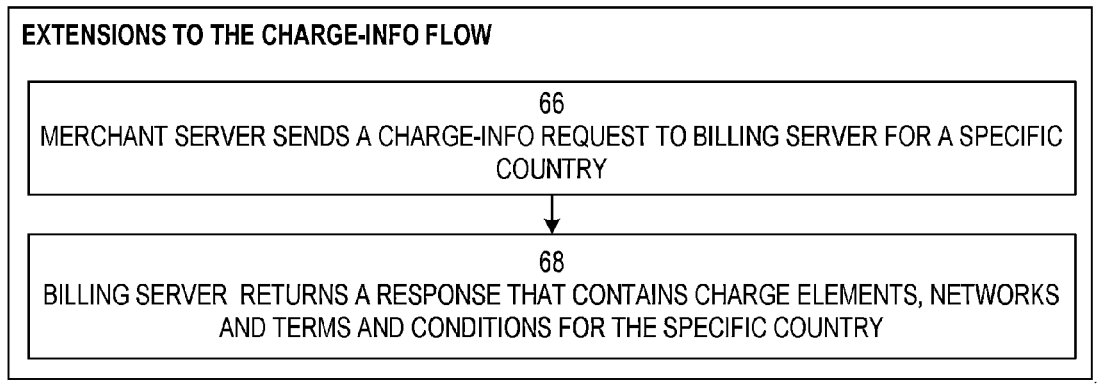
FIG. 6 is a flow chart illustrating extensions, or a variation, of the charge-info method.

FIG. 6 illustrates an extension (a variation) of the charge-info method. At 66, the merchant server 14 sends a charge-info request to the billing server 16 for a specific country. At 68, the billing server 16 returns a response that contains charge elements, network and terms and conditions for the specific country.

After the merchant server 14 receives the data from the consumer mobile phone 12 at 62 in FIGS. 2 and 4, the merchant server 14 at 72 in FIG. 2 transmits a first phone-on-file opt-in API call to the billing server 16. The first phone-on-file opt-in API call is submitted to a dedicated URL of the billing server 16 such as https://gateway.billingserver.com/opt-in. A phone-on-file opt-in method is then used by the merchant server 14 and the billing server 16 to obtain a phone-on-file opt-in from a consumer mobile phone 12 to share a phone number on file and automatically billing against the phone number without confirmation from the consumer mobile phone 12.

The phone-on-file opt-in method is used to obtain a phone-on-file opt-in from a consumer to place their phone-on-file for a specific set of terms with a merchant (e.g., $100 or 90 days of spend). For example, when a merchant offers a phone-on-file opt-in, this method is used to obtain a consumer phone-on-file opt-in that confirms their approval for the phone-on-file and requires that the merchant provide the following:
  consumer-id (unique identifier for the consumer)
  msisdn (internationally formatted mobile number)

Figure 7:
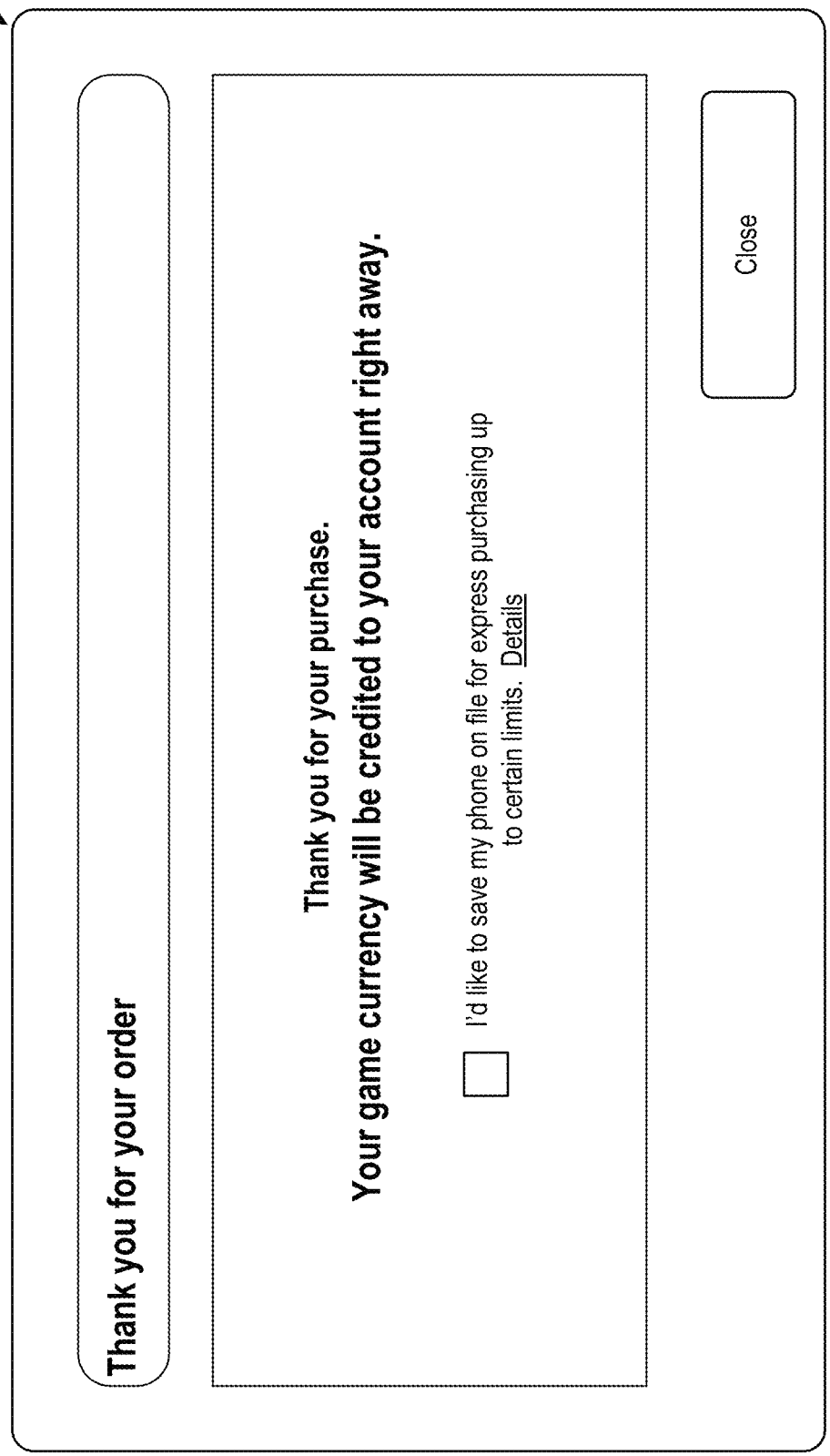
FIG. 7 is a view of the user interface wherein a consumer can select to opt-in to a phone-on-file relationship.

FIG. 7 illustrates a view of the user interface 20 after the consumer has completed a transaction, wherein the consumer is asked to opt-in to a phone-in-file relationship by selecting a check box. The consumer can also mouse over "details" and receive terms and conditions as indicated at the bottom of FIG. 5D. The consumer opts in to a phone-on-file relationship and limits the purchases for up to $100 or 90 days of spend.

Figure 8:
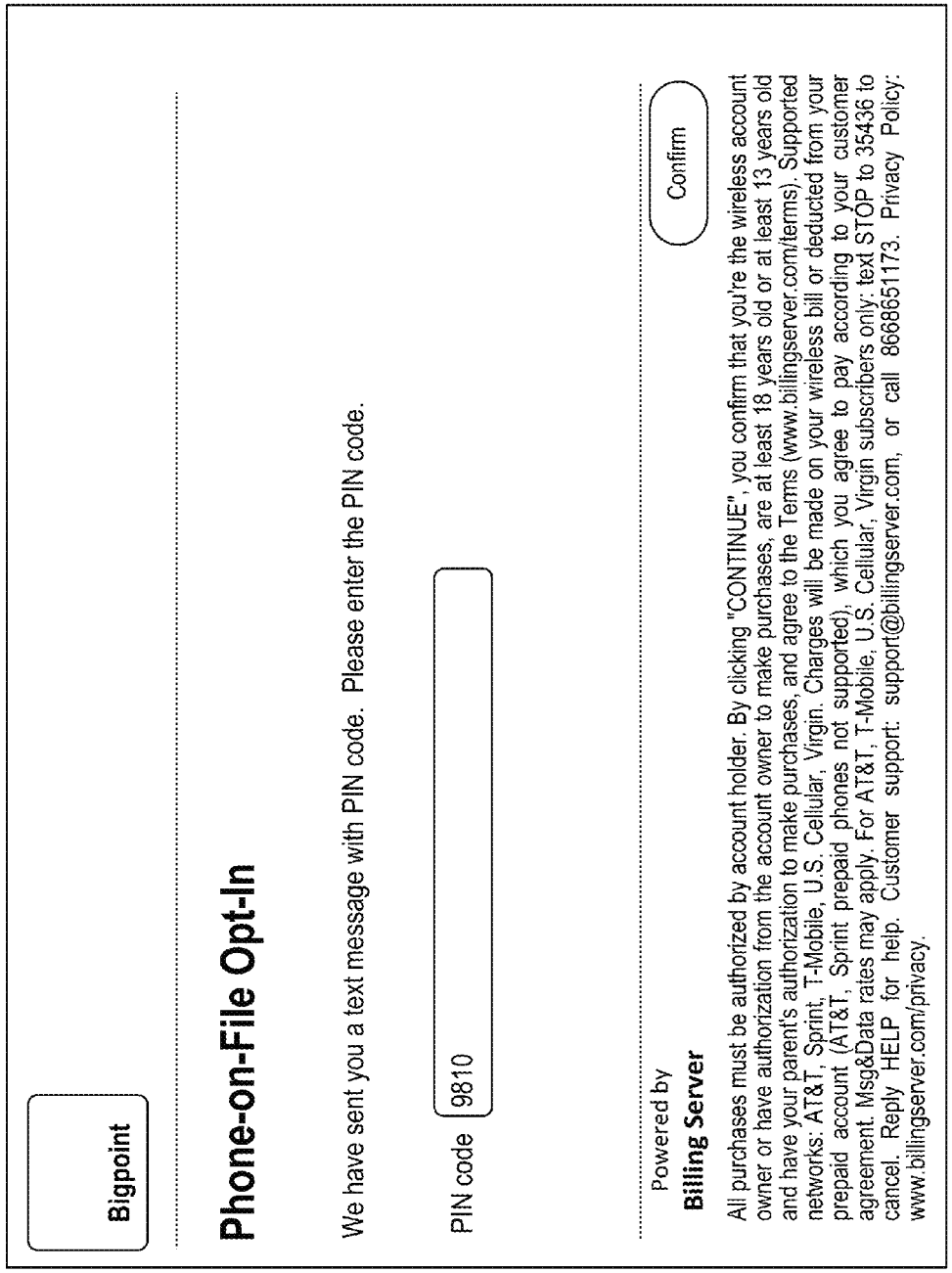
FIG. 8 is a view of the user interface for the consumer to enter a PIN code.

Referring again to FIG. 2, the billing server 16 generates a unique PIN code and transmits the PIN code in a text message to the consumer mobile phone 12 at 76 in FIG. 2, the user interface 20 in FIG. 1 displays a PIN code field to the consumer mobile phone 12 as further illustrated in FIG. 8. At 78 in FIG. 2, the consumer at the consumer mobile phone 12 enters the PIN code received in the text message of FIG. 7 into the PIN code field and transmits it to the merchant server 14. The merchant server 14 receives the PIN code from the consumer mobile phone 12 and at 80 in FIG. 2 transmits the retrieved PIN code, along with the msisdn and consumer-id, in a second phone-on-file opt-in request to the same URL as the first phone-on-file opt-in request at the billing server 16. The billing server 16 then verifies and validates the PIN code received from the merchant server 14 at 80 against the PIN code transmitted in the text message at 74, and sends a response back to the merchant server 14. The billing server 16 and the merchant server 14 each record or store the result of the consumer's phone-on-file opt-in so that it can be referenced on subsequent charge API calls that occur when the user is charged for the renewal subscription billing cycles.

Table 3 shows the phone-on-file opt-in request parameters that are transmitted at 72 and 80 in FIG. 2. Tables 4 and 5 show phone-on-file opt-in response parameters that are determined by the billing server 16 and provided to the merchant server 14 in response to the calls at 72 and 80 in FIG. 2.

TABLE 3

| Parameter | Type | Description | Required |
|---|---|---|---|
| consumer-id | String | Merchant provided unique consumer identifier. | Yes |
| country | String | Country code in ISO 3166-1-alpha-2 standard. | Yes |
| item-description | String | The exact quantity and name of the item(s) being purchased. If more than one of an item is being purchased (e.g. "1000 Credits"), the quantity must be included. Overrides the "Product Description". Restrict to 20 characters. Longer strings will be truncated. | No - only if PoF signup occurs during purchase |
| mcc | Number | Mobile Country Code (MCC). MCC and MNC are used together. If used both must be supplied. | No |
| merchant-id | String | Billing server assigned merchant identifier value. | Yes |
| mnc | Number | Mobile Network Code (MNC). | No |
| msisdn | String | Subscriber mobile phone number in international MSISDN format: country code + mobile phone number. | Yes |
| network | String | Billing server network code as supplied from the 'charge-info'. | Conditional |
| pin-code | String | PIN code entered by consumer to indicate phone-on-file opt-in for payment. | Conditional |
| service-id | String | Merchant offering identifier. | No - only if PoF signup occurs during purchase |
| client-type | String | Specifies the platform where the end user is initiating the phone-on-file opt-in. Examples: WEB, MOBILE_WEB, CONSOLE. | No |

TABLE 4

| Field | Type | Description | Returned |
|---|---|---|---|
| result-code | String | The result code for this request. | Yes |
| result-message | String | Human readable description of the result. | Yes |
| phone-on-file-terms | String | Human readable description of phone-on-file limits that must be displayed to the consumer in the merchant interface. | Yes |

TABLE 5

| Result Code | Result Message | Notes |
|---|---|---|
| 0 | Verified. | PIN code successfully verified. |
| 23 | Verification in progress. | PIN code has been sent to consumer, but has not been verified. |
| 24 | Cannot determine network from Input Parameters. | Network code or MCC/MNC passed in is invalid. |
| 34 | Invalid or missing service-id. | |
| 36 | Invalid or Missing Country Code. | |
| 43 | Invalid Request. | MSISDN or consumer-id is missing or malformed. |
| 103 | Invalid PIN code. | Submitted PIN code is incorrect. |
| 105 | Invalid or missing item description. | |
| 106 | Invalid or missing subscription terms. | |
| 109 | PIN code expired. | The correct PIN code was submitted, but the PIN code has expired. |
| 110 | Verification failed. | Incorrect PIN code was submitted three times. On the next 'optin' API call, a new PIN code will be generated and sent to the consumer via SMS. |
| 120 | Network not found. | Cannot determine network for the MSISDN. |
| 121 | The submitted network does not match the network determined for the MSISDN. | |

Figure 9:
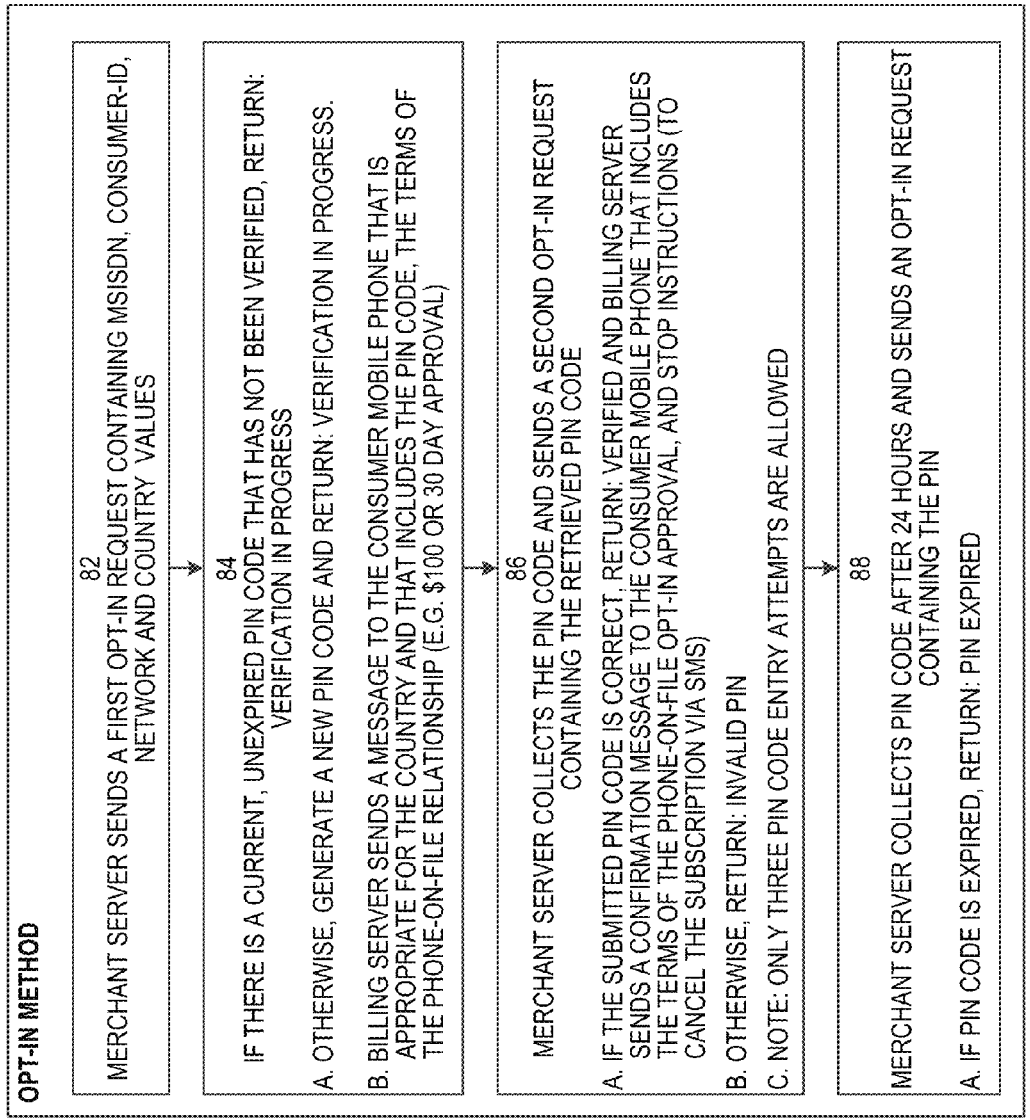
FIG. 9 is a flow chart of a phone-on-file opt-in method that is used to send the text message, including the PIN code for purposes of the consumer to enter the PIN code in the view of FIG. 8 during a phone-on-file opt-in request by the merchant server to the billing server.

An example of the phone-on-file opt-in method is illustrated in FIG. 9. At 82, the merchant server 14 sends a phone-on-file opt-in request containing the msisdn, consumer-id, network and country values. At 84, if there is a current, unexpired PIN code that has not been verified, then VERIFICATION IN PROGRESS is returned. Otherwise, a new PIN code is generated and VERIFICATION IN PROGRESS is returned. The billing server 16 at 74 in FIG. 2 sends a message to the consumer mobile phone 12 that is appropriate for the country and that includes the PIN code, the phone-on-file relationship (e.g. $100 or 30 days approval).

At 86, the merchant server 14 collects the PIN code transmitted at 78 in FIG. 2, and at 80 in FIG. 2, sends a phone-on-file opt-in request containing the retrieved PIN code. If the submitted PIN code is correct, then VERIFIED is returned and the billing server 16 sends a confirmation message to the consumer mobile phone 12 that includes the terms of the phone-on-file opt-in, the subscription, and STOP instructions (to cancel the subscription via SMS). Otherwise, INVALID PIN is returned. Only three PIN code entry attempts (or other limited number of attempts) are allowed.

At 88, the merchant server 14 collects a PIN code after 24 hours and sends a phone-on-file opt-in request containing the PIN. If PIN code is expired, then PIN EXPIRED is returned.

Figure 11:
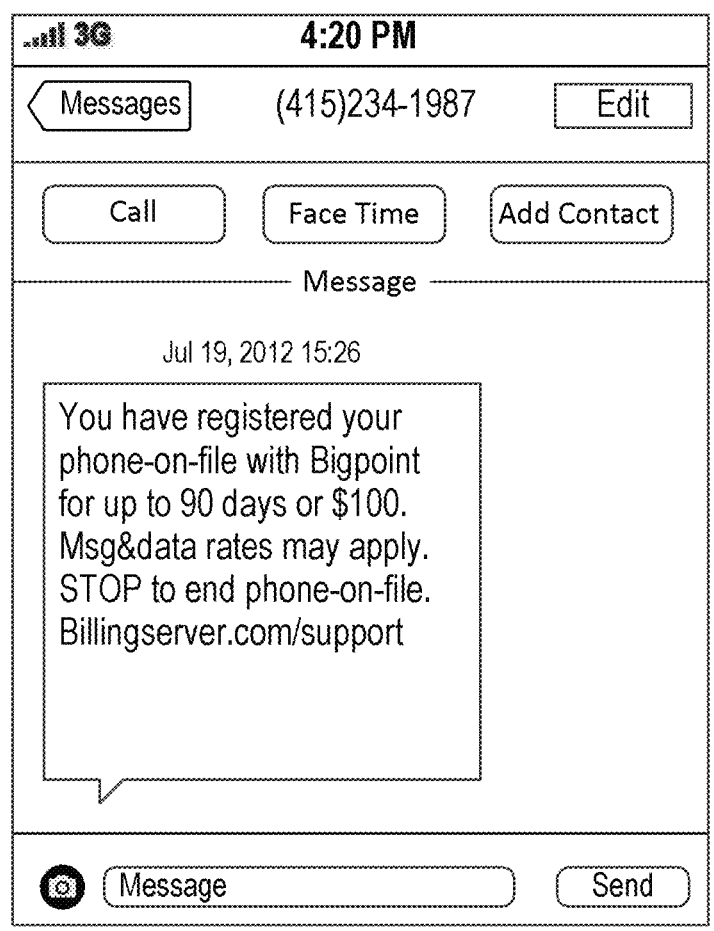
FIG. 11 shows a text message that is received by the consumer mobile phone indicating successful phone-on-file opt-in for the subscription and discloses the terms of the subscription and provides instructions to the consumer how to cancel their subscription.

FIG. 10 is a view of the user interface 20 in FIG. 2 that is displayed to the consumer mobile phone 12 to indicate that the PIN code has been transmitted and has been verified and that the phone-on-file opt-in is now available to the consumer account on the merchant server 14. FIG. 11 shows a text message that the SMS messaging module 28 transmits to the consumer mobile phone 12 at 90 in FIG. 2 indicating successful processing of opt-in for the phone-on-file opt-in and discloses the terms of the phone-on-file opt-in and provides instructions to the consumer how to cancel their phone-on-file opt-in. The text message in FIG. 11 is not sent if the phone-on-file opt-in fails due to the PIN code not being verified.

Figure 12:
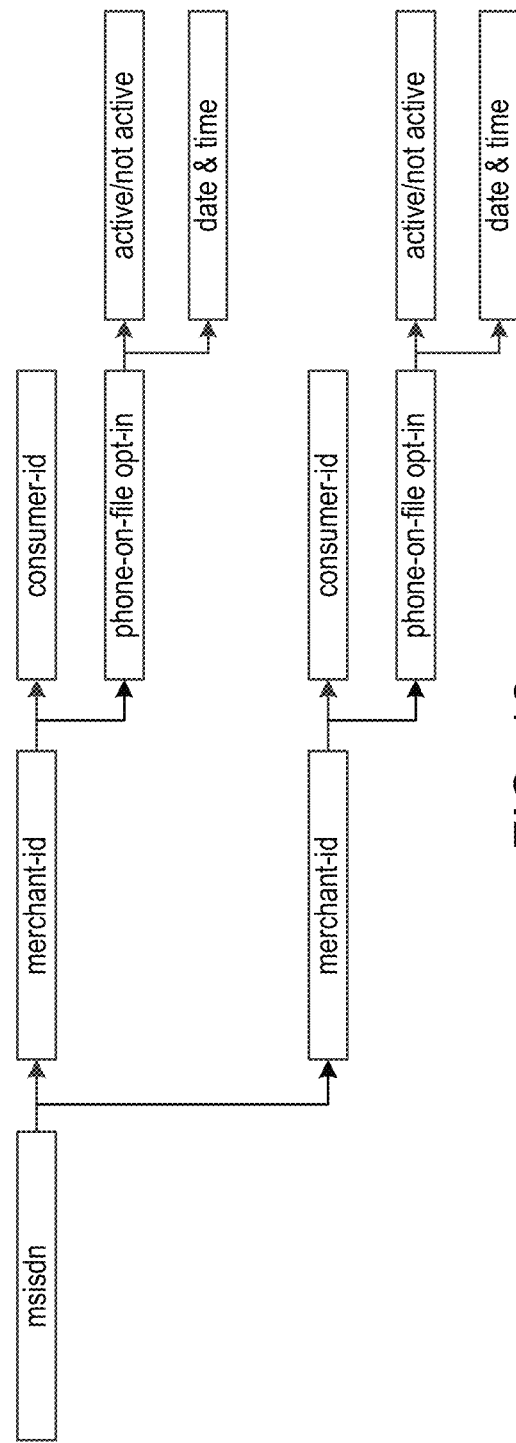
FIG. 12 shows a data structure to indicate an active/inactive phone-on-file opt-in within the billing server.

FIG. 12 shows a data structure within the consumer opt-in management module 24 in FIG. 1. A msisdn for a particular merchant-id is retrieved from the respective merchant server 14 when the user enters their msisdn at the respective merchant server 14 corresponding to the merchant-id. The phone-on-file opt-in status of the respective merchant-id is stored as active and the date and time of the activation and can later be set in a selectable manner to inactive. If the phone-on-file opt-in fails, the activation is also set to inactive. A consumer-id allows a consumer mobile phone 12 to login to an account at the billing server 16. All parameters are stored in relation to a respective msisdn. Each phone number may have multiple merchant-id's, each having a respective phone-on-file opt-in with respective active/not active settings. A consumer-id allows a user who has logged in to the billing server 16 to modify phone-on-file opt-in parameters.

Referring again to FIG. 2, when a purchase is made by a consumer at the merchant server 14, the merchant server 14 at 98 transmits a charge API call to the billing server 16 to request processing of a payment from the consumer mobile phone 12 in a single step. The charge API call is submitted to a dedicated URL of the billing server 16. A charge method can be used to support a one-time charge scenario. The merchant-id value that is received in the charge API call references the merchant-id that was collected in the phone-on-file opt-in request. This enables the billing server 16 to check whether there is a corresponding consumer phone-on-file opt-in for the merchant-id with a status that is active. In another embodiment another identifier can be received by the billing server 16 from the merchant server 14 for determining the phone-on-file opt-in status. If the opt-in status is active, the billing server 16 proceeds to step 100. If the opt-in status is inactive, the billing server 16 again executes the steps as described with reference to FIGS. 5A to 5E wherein a PIN code verification is carried out.

If the charge request is accepted, a charge-id is returned from the billing server 16 to the merchant server 14 at 104 in FIG. 2. Acceptance means that the request has been successfully validated and has been submitted at 100 in FIG. 2 to the carrier server 18 for processing with a valid response from the carrier server 18 at 102. Prior to submitting a charge to the carrier server 18 for processing, risk checks would have already been performed by the billing server 16.

Charge is an asynchronous request. When the charge request has been completed, regardless of a successful or failed charge, the billing server 16, having received the charge result from the carrier server 18, sends a callback notification to the merchant server 14 with the final result of the charge attempt.

The charge request is idempotent. Each request is uniquely identified by the request-id supplied by the merchant server 14. For example, if two charge requests are made with the same merchant request-id, the user's account is charged only once and both charge requests receive the same response.

A chargeresult callback notification provides the final status of a transaction (success or failure) successfully billed chargeresult callback notifications are used by the merchant server 14 to fulfill purchases. For a given transaction, identified by the unique charge-id field value, fulfillment occurs only once. The merchant server 14 may receive a chargeresult callback for the same transaction multiple times if there are communication issues between the billing server 16 and the merchant server 14. Improper acknowledgement responses (ACKs) from the merchant server 14 to the billing server 16 is a common cause of continually retried callback notifications.

The merchant server 14 only receives callbacks from the billing server 16 for requests that have been accepted. If a request was not accepted due to a validation error or due to a risk check, the billing server 16 does not submit the request to the carrier server 18 for processing and therefore callback notification is not sent from the billing server 16 to the merchant server 14.

Table 6 shows parameters for the charge request at 98 in FIG. 2. Table 7 shows parameters for the chargeresult callback notification at 104 in FIG. 2.

TABLE 6

| Parameter | Type | Description | Required |
|---|---|---|---|
| msisdn | Number | Subscriber mobile phone number in international MSISDN format: country code + mobile phone number. | Yes |
| merchant-d | String | Billing server assigned merchant identifier value. | Yes |
| consumer-id | String | Merchant provided unique consumer identifier. | Yes |
| consumer-ip-address | String | Originating IP address of the consumer; used for risk checks. If it cannot be obtained submit a value of 'NOT_AVAILABL'. | Yes |
| service-id | String | Merchant offering identifier. | Yes |
| end-merchant-id | String | Billing server assigned merchant identifier for an end merchant submitting transactions via a reseller. | Conditional (if reseller) |
| country | String | Country code in ISO 3166-1-alpha-2 standard. | Yes |
| network | String | Billing server assigned unique network code for a carrier. | No (If not supplied, Billing server use HLR lookup to determine the carrier) |
| currency | String | ISO 4217 3 letter currency code. | Yes |
| item-description | String | Product disclosure describing the | Yes |

TABLE 6-continued

| Parameter | Type | Description | Required |
|---|---|---|---|
| | | quantity and type of item being purchased. (i.e. "10 credits" not "credits"). Restricted to 20 characters. Longer strings will be truncated. | |
| tax-amount | Number | Tax amount. Value reported in fractional units. (See 'Currency values format' section in this document for more information on fractional units). | No |
| total-amount | Number | Total amount charged including tax. The amount to charge. (Value is in fractional units). | Yes |
| mcc | String | Mobile country code (MCC). Mcc and mnc are used together. If used, both must be supplied. | No |
| mnc | String | Mobile network code (MNC). | No |
| request-id | String | Unique merchant assigned request ID. | Yes |
| charge-options | String | JSON structure containing optional charge elements such as zip or rrn. i.e.{'zip 94939}. | Conditional (optional elements required in specific countries) |
| external-id | String | External identifier supplied by merchant system. | No |
| external-item-id | String | Merchant assigned identifier for the purchased item. | No |
| external-data | String | Merchant supplied meta data. | No |

TABLE 7

| Field | Type | Description | Returned |
|---|---|---|---|
| charge-id | String | Billing server assigned charge identifier (returned if the 'charge' request is successful). | Conditional |
| consumer-auth-required | Boolean | Indicates whether the 'charge' request requires a consumer phone-on-file opt-in. | Yes |
| consumer-auth-type | Enum | The type of phone-on-file opt-in required for this country and carrier. (e.g. KEYWORD, PIN). | Conditional |
| consumer-auth-keyword | String | The keyword the consumer must enter to confirm their phone-on-file opt-in. | Conditional |
| consumer-auth-short-code | String | The short code to which the consumer should send the keyword. | Conditional |
| result-code | String | The result code for this request. | Yes |
| result-message | String | Human readable description of the result. | Yes |
| retry-delay | Number | Specifies the minimum time (in milliseconds) that the caller should wait before retrying the request. Returned when a retry error has occurred. | Conditional |

Figure 13:
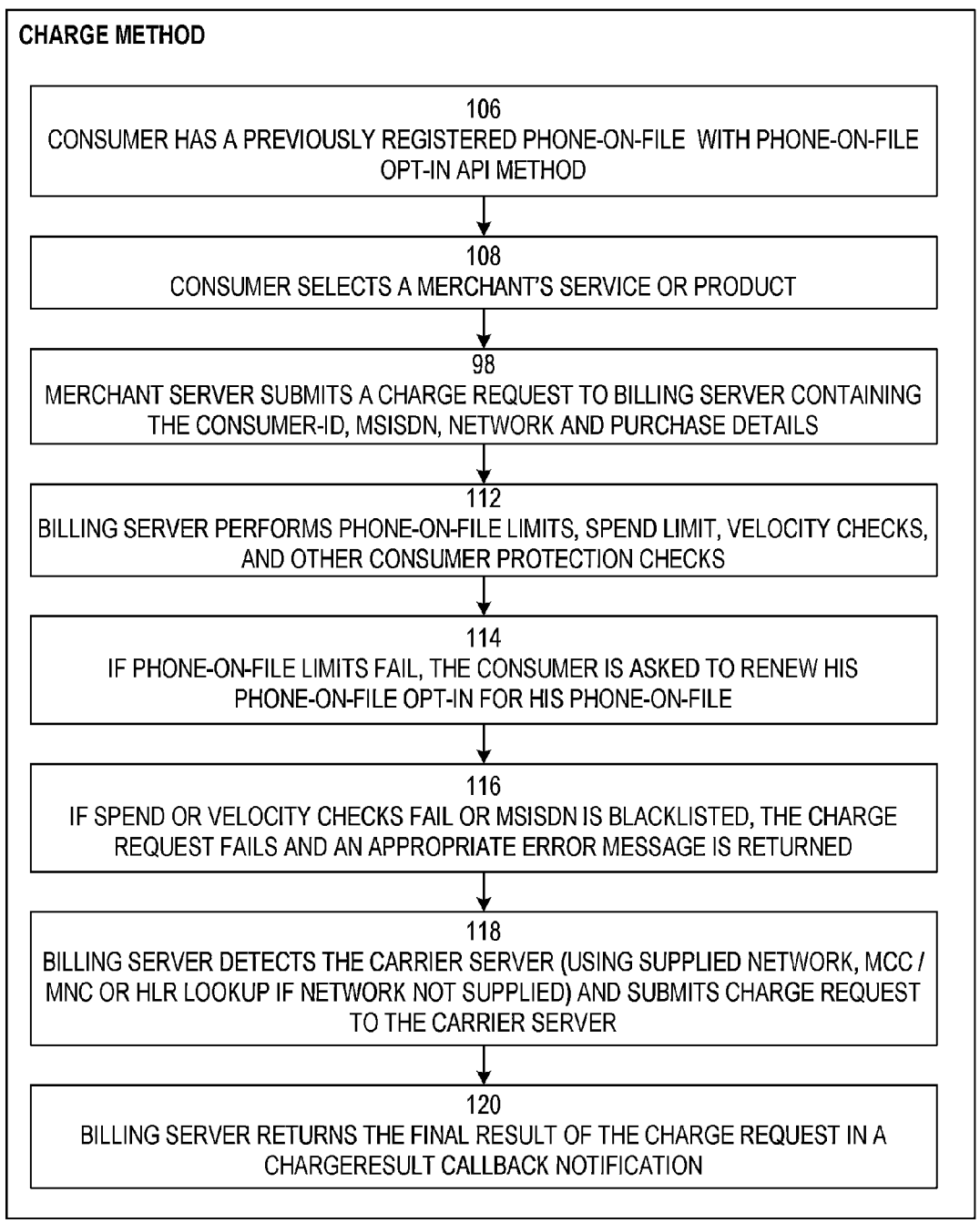
FIG. 13 is a flow chart of a charge method wherein the merchant server instructs the billing serve to charge a user account at the carrier server based on the subscription.

FIG. 13 shows an example of a charge method. At 106, a consumer at a consumer mobile phone 12 or other consumer device has a previously registered phone-on-file with phone-on-file opt-in API method. At 108, the consumer at a consumer mobile phone 12 or other consumer device returns to the merchant server 14 and selects a service or product. At 98, the merchant server 14 submits a charge request to the billing server 16 containing the customer-id, msisdn, network and purchase details. At 112, the billing server 16 performs phone-on-file limits, spend limit, velocity checks, and other consumer protection checks. If phone-on-file limits fail, the consumer, at 114, is asked to renew his phone-on-file opt-in for his phone-on-file. If spend or velocity checks fail or the msisdn is blacklisted, the charge request fails at 116 and an appropriate error message is returned. At 118, the billing server 16 detects the carrier (using supplied network or a lookup if the network is not supplied) and submits a charge request to renew the carrier. At 120, the billing server 16 returns the final result of the charge request in a chargeresult callback notification to the merchant server 14. The SMS messaging module 28 then at 120 in FIG. 2 transmits a text message to the consumer mobile phone 12 to confirm the purchase.

As noted above, the charge is processed without communicating with the consumer mobile phone 12 as at 74 in FIG. 2. If the opt-in status is inactive, however, then the billing server 16 proceeds as described at 74 in FIG. 2 to send a text message containing a new PIN code to the consumer mobile phone 12 and the steps up to step 90 in FIG. 2 are repeated.

Figure 14A:
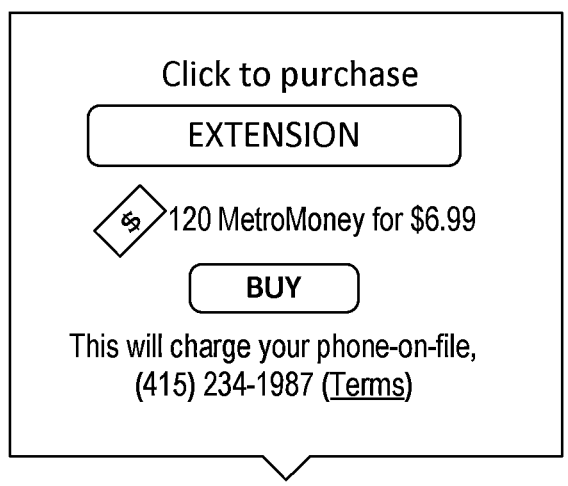
FIG. 14A is a view of the interchange wherein the user selects to make a purchase.
Figure 14B:
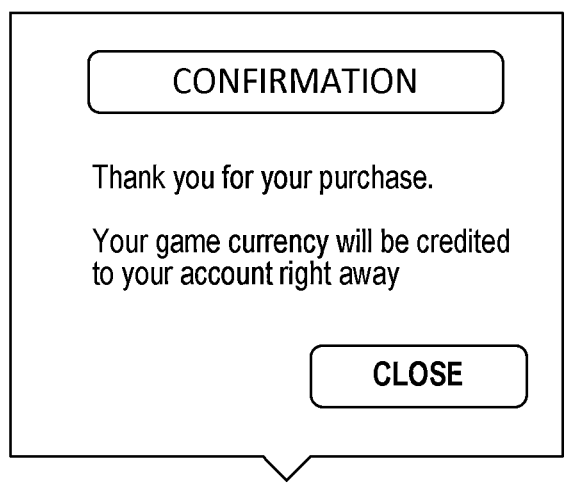
FIG. 14B is a view of the interface after the consumer makes the purchase.
Figure 14C:
FIG. 14C shows a text message that is received by the consumer mobile phone when the charge to the carrier server has occurred.

FIG. 14A is a view of the interchange wherein the user selects to make a purchase. FIG. 14B is a view of the interface after the consumer makes the purchase FIG. 15 shows extensions to the charge flow method in FIG. 13. The assumption is that at 122 the charge request fails. At 124, the merchant server 14 retries charge submitting the charge request with a new request-id. Due to idempotency, if the charge is retried with a request-id that failed earlier, the billing server 16 will return the same failure response. At 126, the billing server 16 uses the carrier charge method to charge the consumer's account. At 128, the billing server 16 returns information indicating the success or failure of the charge request in a chargeresult callback notification.

Tables 8 and 9 show parameters for a chargeresult callback notification.

TABLE 8

| Field | Type | Max Length | Notes |
|---|---|---|---|
| action | String | 20 | action = chargeresult |
| charge-id | String | 50 | Unique identifier of the transaction. |
| country | String | 2 | Country code in ISO 3166-1-alpha-2 standard. |
| currency | String | 3 | ISO 4217 3 letter currency code. |
| encoded-mobile | Number | 20 | Obfuscated, alias consumer identifier. |
| total-amount | Number | Int32 | Total amount of charge inclusive of tax. |
| tax-amount | Number | Int32 | Tax amount value included in charge reported in fractional units (See the 'Currency values format' section of this document for more information on fractional units). |
| merchant-payout | Number | Int32 | Merchant net payout value. |
| service-id | String | 50 | Merchant offering identifier. |
| item-description | String | 255 | Product disclosure describing the quantity and type of item being purchased. (i.e. "10 credits" not "credits"). |

TABLE 8-continued

| Field | Type | Max Length | Notes |
|---|---|---|---|
| request-id | String | 50 | Unique merchant supplied identifier for this request to ensure that charges are not duplicated. |
| external-id | String | 50 | A merchant supplied identifier for this transaction. |
| external-item-id | String | 50 | Merchant assigned identifier for the purchased item. |
| external-data | String | | Merchant supplied meta data. |
| end-merchant-id | String | 50 | If a reseller, this represents the end merchant. |
| reference-currency | String | 3 | Reference currency unit as set within the merchant service configuration |
| reference-total-amount | Number | Int32 | Total charge amount based on the reference currency unit. |
| reference-tax-amount | Number | Int32 | Tax amount based on the reference currency unit. |
| reference-merchant-payout | Number | Int32 | Merchant payout based on the reference currency unit. |
| test | Boolean | Boolean | Used to identify test transactions. (See Testing section in Overview of this document). |
| time-requested | String | UTC Date | Time charge request was initiated in UTC format: YYYY-MM-DD HH:MM:SS. |
| time-completed | String | UTC Date | Time of when the charge request was completed. |
| result-code | String | 20 | The result code for this request. |
| result-message | String | 255 | Human readable description of the result. |
| sig | String | 255 | Hash computation signature generated based on Security Implementation Guide instructions. |
| timestamp | Number | Int64 | Network Time Protocol (NTP) Unix epoch timestamp. |

TABLE 9

| Result Code | Response Message | Comments |
|---|---|---|
| 0 | Operation successful. | Fully paid, successful transaction. |
| 2 | Internal server error. Retry. | Internal billing server error. Notify billing server if this response continues. |
| 3 | Failed - Insufficient funds. | Consumer does not have enough credit to complete the transaction. |
| 4 | Failed - Consumer Barred. | The consumer has been blocked from transacting. This could be due to a carrier request or due to other anti-fraud mechanisms. |
| 5 | Failed - External billing failure | This response occurs when billing server is unable to bill the consumer account due to an error received from the carrier. |
| 6 | Failed - Transaction timed out | This error occurs when the transaction does not complete within 24 hours. There are two primary causes for this: A confirmation has been sent to the consumer (e.g. PIN code entry) and they have not responded. There is a delay or outage with the carrier and billing server has not received a response from the carrier. |
| 7 | Anti-fraud - Transaction rejected | In certain cases, anti-fraud limits may result in a transaction failing e.g. velocity limits. |
| 8 | Failed - Cancelled by | The consumer sent back a keyword to cancel the transaction. |
| 11 | Regulatory spend limit reached | Regulatory (per carrier rules) spend limit has been reached by the consumer. |
| 12 | Merchant spend limit reached | Merchant specified spend limit has been reached by the consumer. |
| 14 | Service suspended | |
| 15 | Network unavailable | |
| 67 | Product description pending approval | This error occurs when product descriptions submitted to the carrier for approval have not yet been approved. |
| 68 | Rejected product description | This error occurs when product descriptions submitted to the carrier are rejected. |
| 86 | Service not supported on network | |
| 90 | Pre-paid account not supported | Pre-paid mobiles are not supported by certain carriers. |
| 95 | Price point not supported on this network | |
| 96 | Account not authorized for purchase | Consumer account cannot use mobile billing service. |
| 97 | Invalid Zip Code | Applicable for certain carrier billing workflows that require consumer entry of a zip code. |

TABLE 9-continued

| Result Code | Response Message | Comments |
|---|---|---|
| 101 | Fulfillment failed | A problem with callback ACK caused a fulfillment failure. The transaction was not billed. This is applicable to carrier networks that require fulfillment to occur before billing the consumer. |
| 500 | Consumer info validation error | Applicable to certain carrier billing workflows that require the consumer to enter additional information for validation purposes. |
| 700 | Handset error | Error due sending or receiving the necessary SMS messages to proceed with purchase. |
| 800 | Subscriber not eligible | Certain types of consumers cannot make purchases using the billing server system e.g. minors. |
| 850 | Internal subscription error | Needs further investigating by billing server. |

Figure 16:
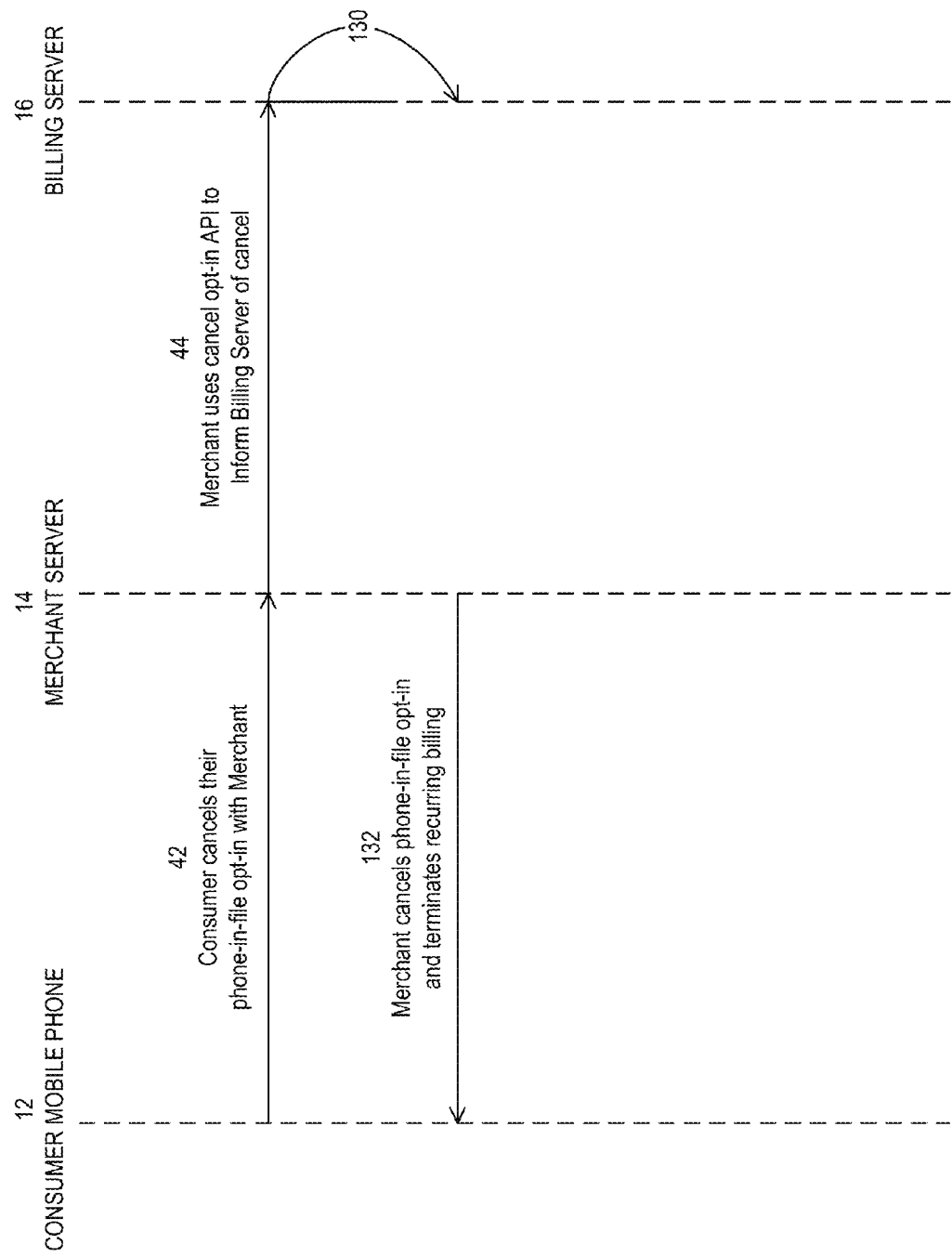
FIG. 16 is an interactive chart showing how the consumer can cancel the subscription through the interface of the merchant server.

FIG. 16 shows the method referenced with respect to FIG. 1 wherein the consumer mobile phone 12 cancels the phone-on-file opt-in via the user interface 20. At 42 in FIG. 18, the consumer mobile phone 12 cancels with the merchant server 14 using the user interface 20 in FIG. 1 of the merchant server 14. At 44, the merchant server 14 submits a cancel-phone-on-file opt-in API call at a dedicated URL of the billing server 16 to notify the billing server 16 to cancel the phone-on-file opt-in corresponding to the merchant-id. At 130, the billing server 16 cancels the consumer phone-on-file opt-in and updates the relevant merchant-id in FIG. 12 as inactive. Further charges against this merchant-id, if submitted by the merchant server 14 to the billing server 16, will be confirmed via text message to the consumer mobile phone 12. At 132, the merchant server 14 updates the user interface 20 to reflect that the phone-on-file has been cancelled.

Figure 17:
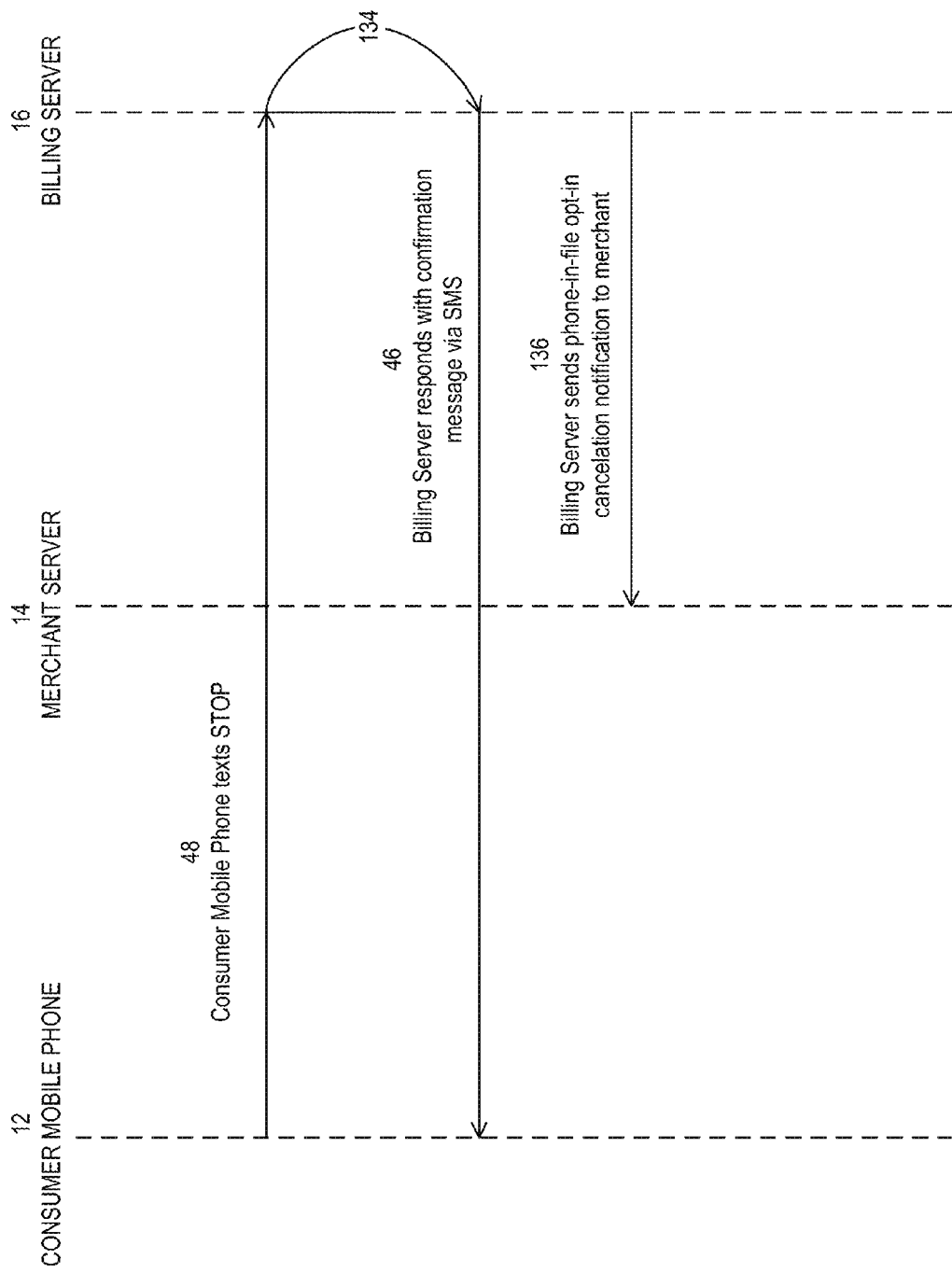
FIG. 17 is an interactive chart showing how the consumer can cancel the subscription by sending a text message to the billing server.

FIG. 17 shows the method referenced with respect to FIG. 1 wherein the consumer cancels the phone-on-file opt-in via text messaging. At 48, the consumer mobile phone 12 sends STOP via SMS text. The text message can be sent as a reply to the short code 723-53 from which the texts were received by the consumer mobile phone 12. At 134, the billing server 16 cancels the phone-on-file opt-in and updates the relevant merchant-id in FIG. 12 as inactive. Further charges against this merchant-id, if submitted by the merchant server 14, will be confirmed via text message with the consumer mobile phone 12. At 46, the billing server 16 sends a confirmation of cancellation SMS text to the consumer mobile phone 12. At 136, the billing server 16 sends a consumer phone-on-file opt-in cancellation notification to the merchant server 14 so that the subscription is cancelled at the merchant server 14. The merchant server 14 terminates recurring billing.

Figure 18:
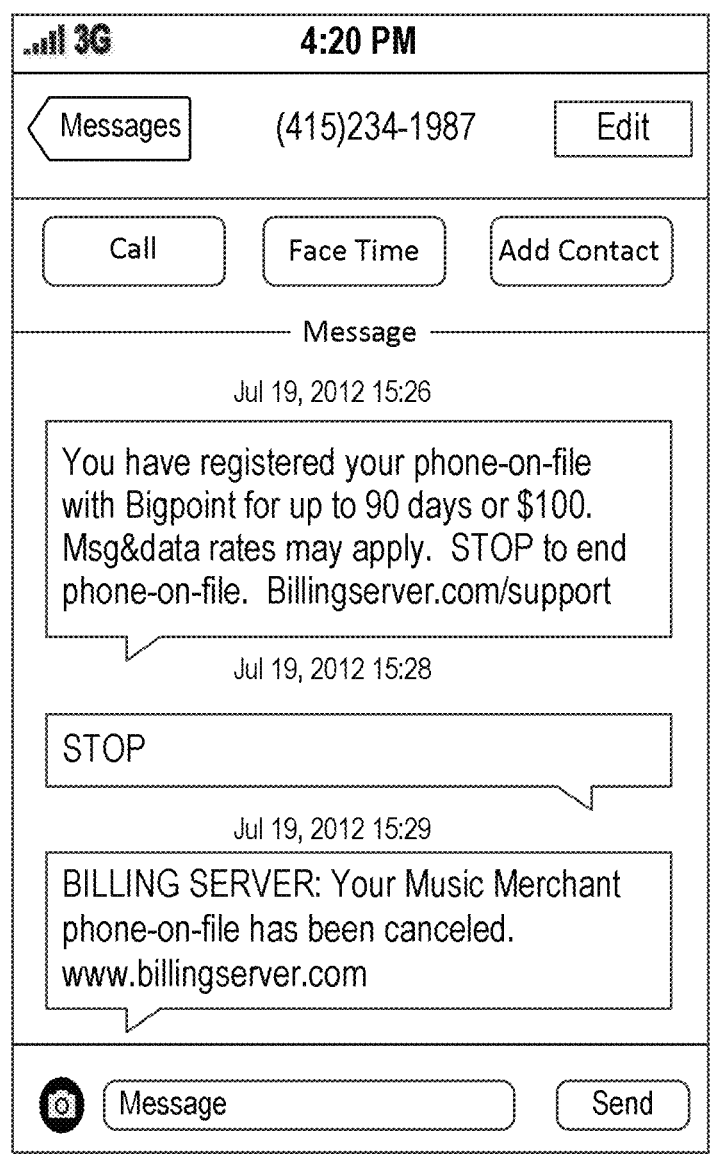
FIG. 18 shows an example of text messages that are exchanged to cancel the subscription as described with reference to FIG. 17.

FIG. 18 shows an example of text messages that are exchanged to cancel the phone-on-file opt-in as described with reference to FIG. 17. The text messages received and sent at 48 and 46 in FIG. 19 are both shown as the second and third messages in FIG. 20.

Figure 19:
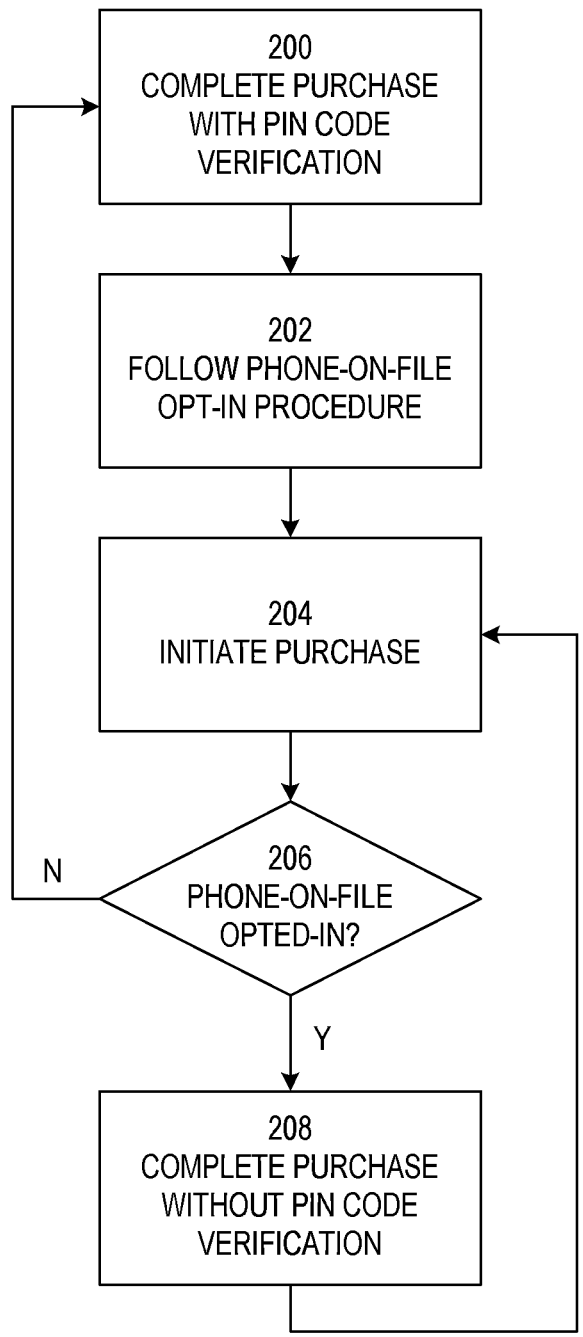
FIG. 19 illustrates a flow chart of the functioning of the system in its entirety.

FIG. 19 illustrates how the procedures hereinbefore described are repeated. At 200, the first purchase is completed with PIN code verification. At 202, a phone-on-file opt-in procedure is carried out. At 204, a subsequent purchase is initiated, but not completed. At 206, a determination is made whether there is a phone-on-file opt-in.

If the determination at 206 is that there is a phone-on-file opt-in, then at 208 the purchase is completed without PIN code verification. If there is a subsequent purchase, the subsequent purchase is initiated at 204.

If at 206 a determination is made that the phone-on-file opt-in is not present, then the purchase is completed at 200 and the phone-on-file opt-in procedure at 202 is carried out.

Figure 20:
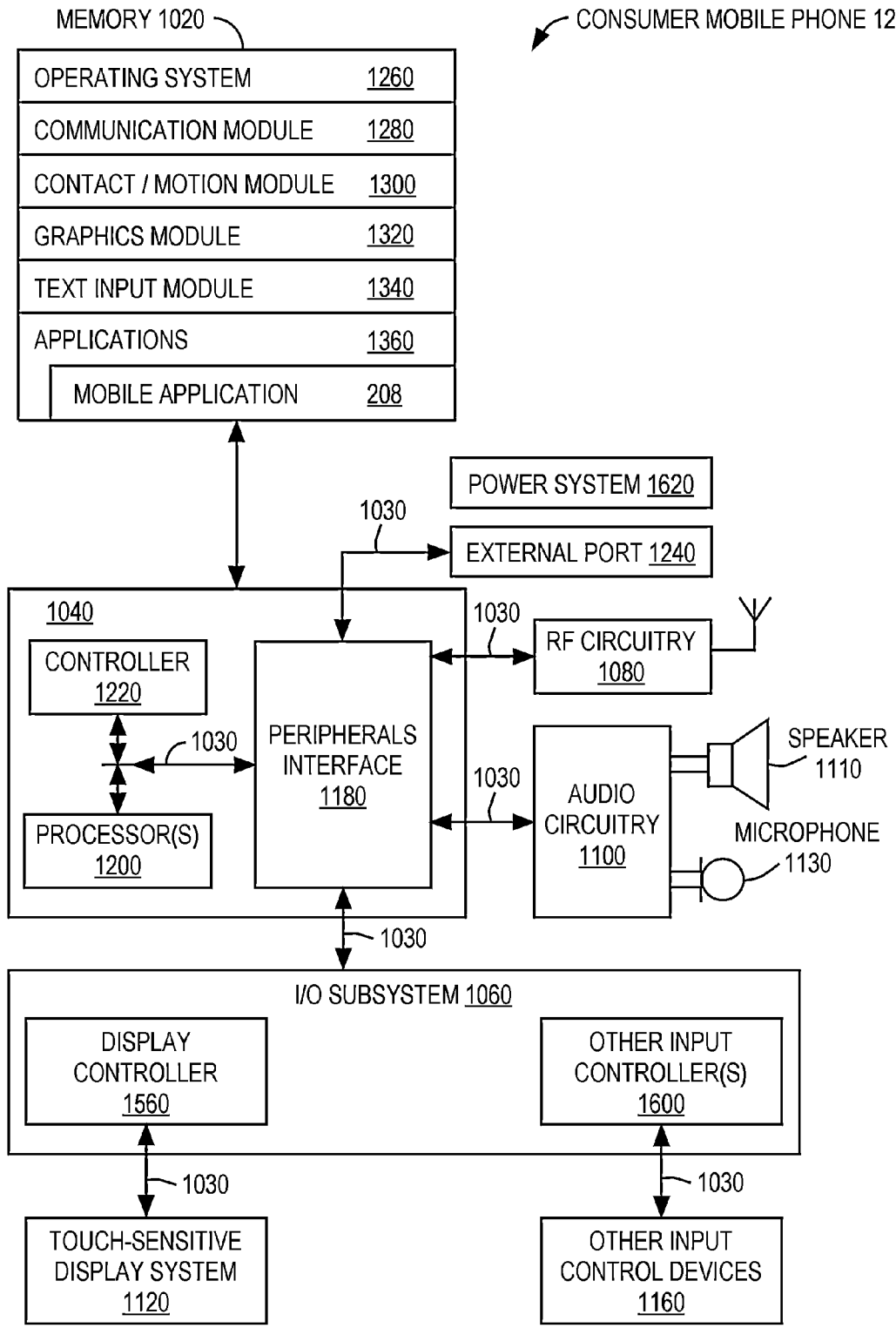
FIG. 20 is a block diagram of the consumer mobile phone illustrating SmartPhone features thereof.

FIG. 20 is a block diagram illustrating the consumer mobile phone 12, illustrating a touch-sensitive display 1120 or a "touch screen" for convenience. The consumer mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 20 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the consumer mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the consumer mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the consumer mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the consumer mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the consumer mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The consumer mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 21:
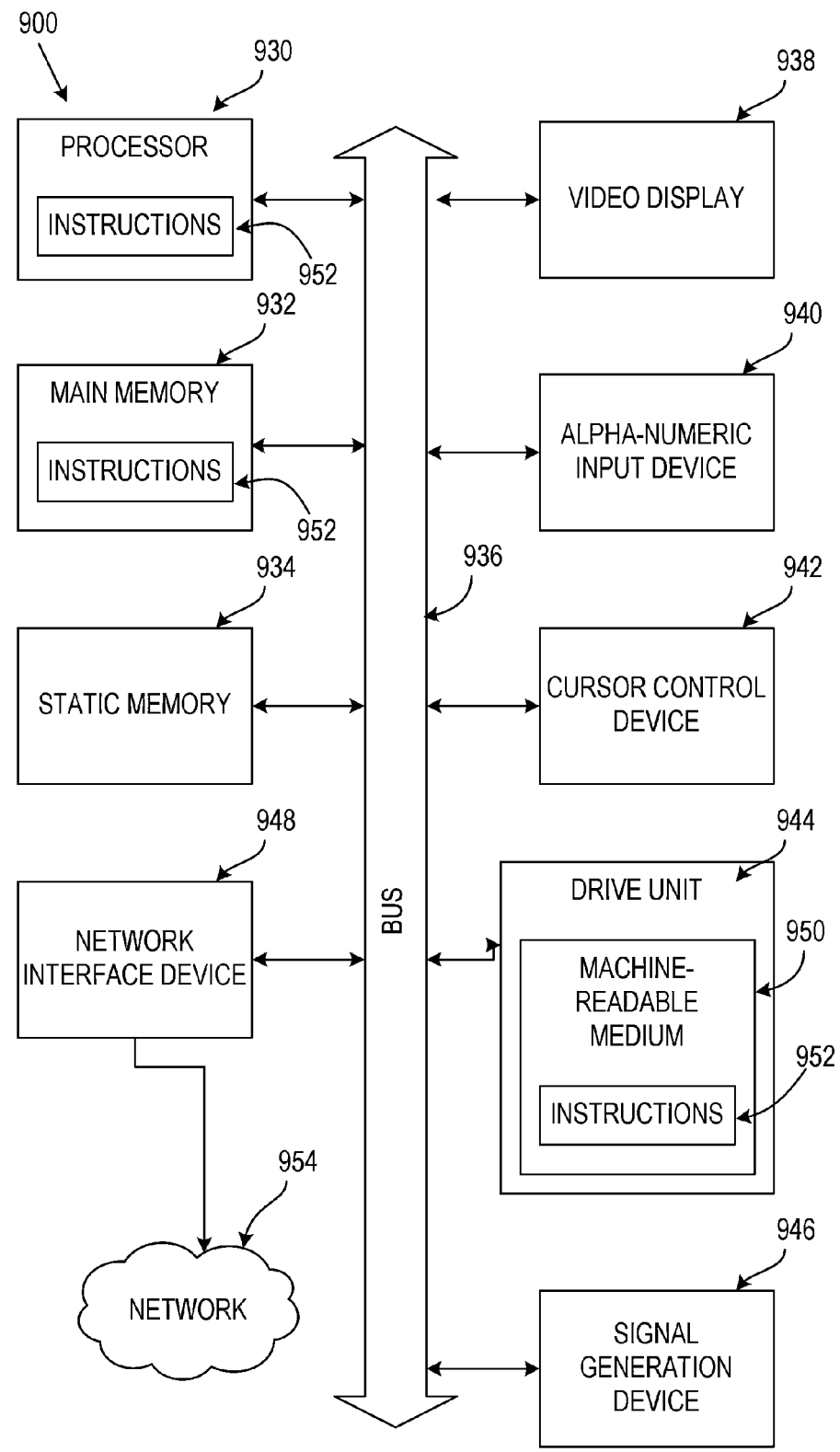
FIG. 21 is a block diagram of a machine in the form of a computer system forming part of the merchant managed subscription system.

FIG. 21 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of managing transactions with a merchant server comprising:

receiving a msisdn from a consumer device at the merchant server;

transmitting a first phone-on-file opt-in request from the merchant server to a billing server, including the msisdn and a merchant-id, being a billing server assigned merchant identifier value, the billing server to generate a PIN code in response to receiving the first phone-on-file opt-in request and transmit a text message to a consumer mobile phone at the msisdn with the PIN code, the consumer to enter the PIN code into the consumer device and transmit the PIN code to the merchant server;

receiving the PIN code from the consumer device;

transmitting a second phone-on-file opt-in request from the merchant server to the billing server, including the PIN code, the billing server to verify the PIN code received in the second phone-on-file opt-in request against the PIN code transmitted in the text message, record a phone-on-file opt-in status as active for the msisdn within the data structure if the PIN code is verified, thereby confirming the first phone-on-file opt-in with a consumer device, and transmitting a response to the merchant server indicating whether the PIN code is verified or invalid; and receiving the response from the billing server at the merchant server indicating whether the PIN code is verified or invalid;

recording a phone-on-file status as verified if the PIN code is verified or invalid if the PIN code is not verified; and if the opt-in status is verified:

transmitting a charge API call from the merchant server to the billing server if the phone-on-file status is verified but not if the phone-on-file status is invalid, the charge API call including an amount and an identifier for the billing server to determine a phone-on-file opt-in status corresponding to the identifier, the billing server to determine a phone-on-file opt-in status corresponding to the identifier at the billing server, transmit a request to charge a user account to a carrier server if the phone-on-file opt-in status is active, without transmitting a text message with a PIN code to a consumer mobile device, the request including an amount corresponding to the amount received in the charge call, and transmit a chargeresult callback notification from the billing server at the merchant server indicating whether a user account at a carrier server has been charged by the billing server; and receiving the chargeresult callback notification from the billing server at the merchant server indicating whether a user account at a carrier server has been charged by the billing server; and if the opt-in status is invalid:
  transmitting, with the merchant server, a call to the billing server with a phone number and amount to be charged and a merchant-id, being a billing server assigned merchant identifier value, the billing server to generate a PIN code in response to receiving the call and transmit a text message to a consumer mobile phone at the msisdn with the PIN code;
  transmitting, with the merchant server, an interface to the consumer device with a PIN field, the consumer to enter the PIN code into the consumer device and transmit the PIN code to the merchant server;
  receiving, at the merchant server, the PIN code entered by a user into the PIN code field;
  transmitting, with the merchant server, the PIN code to the billing server, the billing server to verify the PIN code received from the merchant server against the PIN code transmitted in the text message thereby confirming the transaction with the consumer device, transmitting a request to charge a user account to a carrier server if the transaction is confirmed, and transmit a confirmation to the merchant server that the amount has been charged; and
  receiving, with the merchant server, the confirmation from the billing server that the amount has been charged.

2. The method of claim 1, wherein the first phone-on-file opt-in request includes a merchant-id, the phone-on-file opt-in being recorded as active against the merchant-id.

3. The method of claim 2, wherein the msisdn has a plurality of merchant-id's, each having a separate phone-on-file opt-in parameter that is set in a selectable manner to active or inactive.

4. The method of claim 1, further comprising before transmitting the first phone-on-file opt-in request from the merchant server:
  transmitting, with the merchant server, a call to the billing server with a phone number and amount to be charged;
  transmitting, with the merchant server, an interface to the consumer device with a PIN field;
  receiving, at the merchant server, a PIN code entered by a user into the PIN code field;
  transmitting, with the merchant server, the PIN code to the billing server; and
  receiving, with the merchant server, a confirmation from the billing server that the amount has been charged.

5. The method of claim 1, further comprising:
  transmitting a charge-info request from the merchant server to the billing server;
  receiving charge elements from the billing server at the merchant server in response to the charge-info request;
  transmitting a user interface from the merchant server to a consumer device, the user interface having fields based on the charge elements; and
  receiving, at the merchant server, data entered into the fields at the consumer device, the data received being included in the first phone-on-file opt-in request.

6. The method of claim 1, further comprising:
  transmitting a view of a user interface from the merchant server to a consumer device, the view allowing for selection to cancel the subscription;
  receiving a call to cancel the subscription via the interface from the consumer device at the merchant server; and
  making a cancel-phone-on-file opt-in API call from the merchant server to the billing server to update the phone-on-file opt-in to inactive.

7. A merchant server comprising:
  a processor;
  a computer-readable medium connected to the processor; and
  a set of instructions on the computer-readable medium and executable by the processor, including:
    a user interface transmitted to a consumer device with a msisdn field for entry of a msisdn and receivable by the processor and transmitted to a billing server in a first phone-on-file opt-in request that includes a merchant-id, being a billing server assigned merchant identifier value, the billing server to generate a PIN code in response to receiving the first phone-on-file opt-in request and transmit a text message to a consumer mobile phone at the msisdn with the PIN code, the consumer to enter the PIN code into the consumer device and transmit the PIN code to the merchant server, and a PIN code field for entry of the PIN code and receivable by the processor and transmitted to the billing server in a second phone-on-file opt-in request, the billing server to verify the PIN code received in the second phone-on-file opt-in request against the PIN code transmitted in the text message, record a phone-on-file opt-in status as active for the msisdn within the data structure if the PIN code is verified, thereby confirming the first phone-on-file opt-in with a consumer device, and transmitting a response to the merchant server indicating whether the PIN code is verified or invalid, receiving the response from the billing server at the merchant server indicating whether the PIN code is verified or invalid, and recording a phone-on-file status as verified if the PIN code is verified or invalid if the PIN code is not verified; and
    a recurring billing management module executing a charge method including:
      if the opt-in status is invalid:
        transmitting a charge API call from the merchant server to the billing server if the phone-on-file status is verified but not if the phone-on-file status is invalid, the charge API call including an amount and an identifier for the billing server to determine a phone-on-file opt-in status corresponding to the identifier, the billing server to determine a phone-on-file opt-in status corresponding to the identifier at the billing server, transmit a request to charge a user account to a carrier server if the phone-on-file opt-in status is active, without transmitting a text message with a PIN code to a consumer mobile device, the request including an amount corresponding to the amount received in the charge call, and transmit a chargeresult callback notification from the billing server at the merchant server indicating whether a user account at a carrier server has been charged by the billing server; and
      receiving the chargeresult call back notification from the billing server at the merchant server indicating whether a user account at a carrier server has been charged by the billing server; and
      if the opt-in status is invalid:
        transmitting, with the merchant server, a call to the billing server with a phone number and amount to be charged and a merchant-id, being a billing server assigned merchant identifier value, the billing server to generate a PIN code in response to receiving the call and transmit a text message to a consumer mobile phone at the msisdn with the PIN code;

transmitting, with the merchant server, an interface to the consumer device with a PIN field, the consumer to enter the PIN code into the consumer device and transmit the PIN code to the merchant server;

receiving, at the merchant server, the PIN code entered by a user into the PIN code field;

transmitting, with the merchant server, the PIN code to the billing server, the billing server to verify the PIN code received from the merchant server against the PIN code transmitted in the text message thereby confirming the transaction with the consumer device, transmitting a request to charge a user account to a carrier server if the transaction is confirmed, and transmit a confirmation to the merchant server that the amount has been charged; and receiving, with the merchant server, the confirmation from the billing server that the amount has been charged.

* * * * *